(12) United States Patent
Lv et al.

(10) Patent No.: US 12,184,405 B2
(45) Date of Patent: *Dec. 31, 2024

(54) CLOCK SYNCHRONIZATION METHOD AND APPARATUS, AND STORAGE MEDIUM

(71) Applicant: Huawei Technologies Co., Ltd., Guangdong (CN)

(72) Inventors: Jingfei Lv, Wuhan (CN); Song Liu, Dongguan (CN); Chuan Xu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 680 days.

This patent is subject to a terminal disclaimer.

(21) Appl. No.: 17/360,817

(22) Filed: Jun. 28, 2021

(65) Prior Publication Data

US 2021/0328698 A1  Oct. 21, 2021

Related U.S. Application Data

(63) Continuation of application No. PCT/CN2019/126485, filed on Dec. 19, 2019.

(30) Foreign Application Priority Data

Dec. 29, 2018 (CN) .......................... 201811645615.4

(51) Int. Cl.
*H04J 3/06* (2006.01)
*H04W 56/00* (2009.01)

(52) U.S. Cl.
CPC .......... *H04J 3/0667* (2013.01); *H04J 3/0644* (2013.01); *H04W 56/0015* (2013.01)

(58) Field of Classification Search
None
See application file for complete search history.

(56) References Cited

U.S. PATENT DOCUMENTS

2011/0122775 A1* 5/2011 Zampetti ............... H04L 45/121
370/242
2011/0158120 A1 6/2011 Hamasaki et al.
(Continued)

FOREIGN PATENT DOCUMENTS

| CN | 102035638 A | 4/2011 |
|---|---|---|
| CN | 103051439 A | 4/2013 |

(Continued)

OTHER PUBLICATIONS

IEEE Std 1588TM-2008(Revision of IEEE Std 1588-2002), IEEE Standard for a Precision Clock Synchronization Protocol for Networked Measurement and Control Systems, IEEE Instrumentation and Measurement Society, Sponsored by the Technical Committee on Sensor Technology (TC-9), IEEE, 3 Park Avenue, New York, NY 10016-5997, USA, Jul. 24, 2008, total 289 pages.

*Primary Examiner* — Mariela Vidal Carpio
(74) *Attorney, Agent, or Firm* — WOMBLE BOND DICKINSON (US) LLP

(57) ABSTRACT

This application discloses a clock synchronization method and apparatus, and a storage medium, which pertains to the field of communication technologies. The method includes: first receiving, by a network device, an announce packet from a first master clock node and an announce packet from a second master clock node, when an identifier of a first clock source node carried in the announce packet from the first master clock node is the same as an identifier of a second clock source node carried in the announce packet from the second master clock node, selecting a master clock node with a relatively small clock deviation, and then calibrating a clock of the network device based on time information of the master clock node. In this application, precision of clock synchronization performed by the net- (Continued)

work device is higher, and further, precision of a clock calibrated by the network device is higher.

20 Claims, 7 Drawing Sheets

(56) References Cited

U.S. PATENT DOCUMENTS

| | | | | |
|---|---|---|---|---|
| 2011/0185216 A1* | 7/2011 | Zhao | .......................... | G06F 1/14 |
| | | | | 713/400 |
| 2013/0227172 A1* | 8/2013 | Zheng | .................. | H04J 3/0667 |
| | | | | 709/248 |
| 2016/0359575 A1* | 12/2016 | Ito | ........................... | H04L 69/28 |
| 2018/0013508 A1* | 1/2018 | Rabinovich | ........... | H04J 3/0667 |
| 2019/0116021 A1* | 4/2019 | Tanwar | ................ | H04J 3/0673 |
| 2019/0394017 A1* | 12/2019 | Seo | ......................... | H04L 69/28 |
| 2019/0394739 A1* | 12/2019 | Seo | ....................... | H04W 56/005 |
| 2020/0252150 A1* | 8/2020 | Wen | ....................... | H04J 3/0679 |
| 2020/0403901 A1* | 12/2020 | Sugiyama | ............. | H04L 45/123 |
| 2020/0413360 A1* | 12/2020 | Ruffini | .............. | H04W 56/0015 |
| 2021/0152322 A1* | 5/2021 | Sakaue | ................. | H04J 3/0641 |
| 2021/0242953 A1* | 8/2021 | Kitayama | ............. | H04J 3/0667 |
| 2021/0243713 A1* | 8/2021 | Ellenbeck | ........... | H04W 56/002 |
| 2021/0328696 A1* | 10/2021 | Lv | ......................... | H04J 3/0644 |

FOREIGN PATENT DOCUMENTS

| | | |
|---|---|---|
| CN | 103763055 A | 4/2014 |
| CN | 106341218 A | 1/2017 |
| CN | 107251457 A | 10/2017 |
| CN | 108737658 A | 11/2018 |
| CN | 109218007 A | 1/2019 |
| WO | 2018219334 A1 | 12/2018 |

* cited by examiner

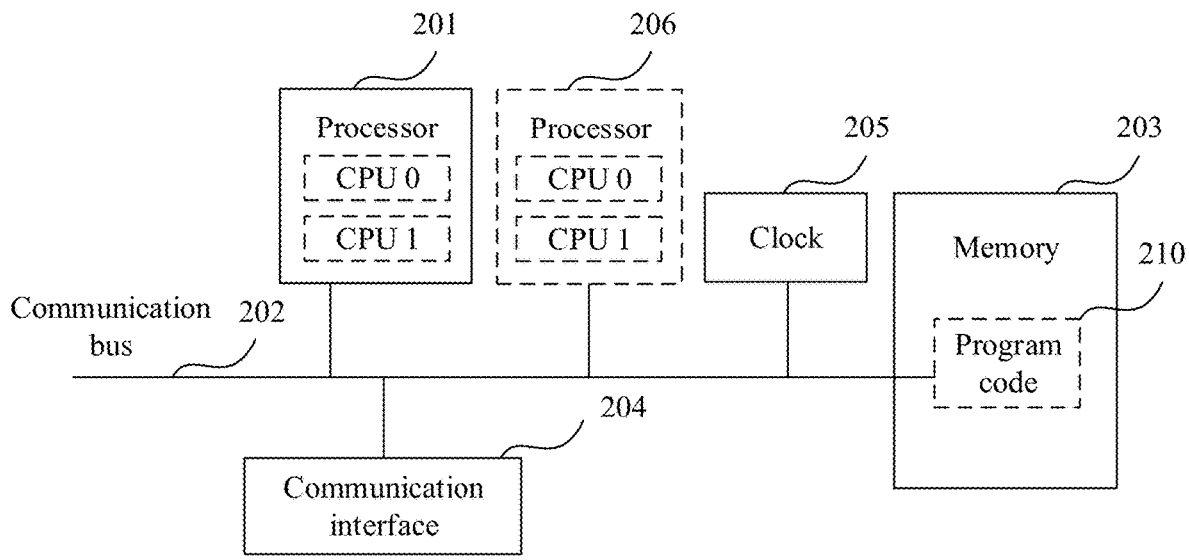

FIG. 2

```
┌──────────────────────────────────────────────────────────────┐
│ A network device receives an announce message from a first   │
│ master clock node and an announce message from a second      │
│ master clock node, where the announce message from the       │ S301
│ first master clock node carries an identifier of a first     │
│ clock source node and a first maximum clock deviation        │
│ accumulated value, the announce message from the second      │
│ master clock node carries an identifier of a second clock    │
│ source node and a second maximum clock deviation             │
│ accumulated value                                            │
└──────────────────────────────────────────────────────────────┘
                              │
                              ▼
┌──────────────────────────────────────────────────────────────┐
│ The network device compares the identifier of the first      │ S302
│ clock source node with the identifier of the second clock    │
│ source node                                                  │
└──────────────────────────────────────────────────────────────┘
                              │
                              ▼
┌──────────────────────────────────────────────────────────────┐
│ When the identifier of the first clock source node is the    │
│ same as the identifier of the second clock source node, the  │
│ network device selects, from the first master clock node     │ S303
│ and the second master clock node based on the first maximum  │
│ clock deviation accumulated value and the second maximum     │
│ clock deviation accumulated value, a master clock node for   │
│ clock synchronization                                        │
└──────────────────────────────────────────────────────────────┘
                              │
                              ▼
┌──────────────────────────────────────────────────────────────┐
│ The network device calibrates a clock of the network device  │ S304
│ based on time information of the selected master clock node  │
└──────────────────────────────────────────────────────────────┘
```

FIG. 3

CLOCK SYNCHRONIZATION METHOD AND APPARATUS, AND STORAGE MEDIUM

CROSS-REFERENCE TO RELATED APPLICATIONS

This application is a continuation of International Application No. PCT/CN2019/126485, filed on Dec. 19, 2019, which claims priority to Chinese Patent Application No. 201811645615.4, filed on Dec. 29, 2018, both of which are incorporated herein by reference in their entireties.

TECHNICAL FIELD

This application relates to the field of communication technologies, and in particular, to a clock synchronization method and apparatus, and a storage medium.

BACKGROUND

Higher requirements on clock synchronization precision accompany the continuous development of telecommunication networks. Therefore, more and more precise clock synchronization protocols emerge. The 1588v2 protocol is a precise clock synchronization protocol defined by the institute of electrical and electronics engineers (IEEE) for network measurement and control systems. A clock synchronization network that complies with the 1588v2 protocol generally includes at least one clock source node and a plurality of clock nodes. For any one of the plurality of clock nodes, the clock node may be connected to one or more upstream network devices. The upstream network device may be referred to as a master clock node. When the clock node is connected to a plurality of master clock nodes, the clock node needs to select one master clock node from the plurality of master clock nodes to perform clock synchronization.

The 1588v2 protocol defines an algorithm for selecting a master clock node. The selection algorithm may also be referred to as a best master clock algorithm (BMCA). When a clock node is connected to a plurality of master clock nodes, the clock node receives (e.g., retrieves, obtains, acquires) a plurality of announce messages from the plurality of master clock nodes. Each announce message carries an identifier of an upstream clock source node of a master clock node and a hop count from the master clock node to the upstream clock source node. The identifiers of the clock source nodes carried in the received announce messages are compared according to the BMCA. If the identifiers of the clock source nodes carried in the received announce messages are the same, it can be determined that upstream clock source nodes of the plurality of master clock nodes are the same. When the plurality of master clock nodes correspond to a same clock source node, a master clock node with a relatively small hop count to the clock source node may be selected from the plurality of master clock nodes, and the selected master clock node is used to perform clock synchronization. However, when the plurality of master clock nodes correspond to a same clock source node, precision of a master clock node selected based on the hop count may not be high, resulting in reduced precision of clock synchronization.

SUMMARY

This application provides a clock synchronization method and apparatus, and a storage medium, to resolve a problem in a related technology that precision of a master clock node selected by a network device is not high, thereby reducing precision of clock synchronization performed by the network device. The technical solutions are as follows.

In some embodiments (sometimes referred to as, a first aspect), a clock synchronization method is provided, where the method includes: receiving, by a network device, an announce message from a first master clock node and/or an announce message from a second master clock node, where the announce message from the first master clock node carries an identifier of a first clock source node and/or a first maximum clock deviation accumulated value, and/or the announce message from the second master clock node carries an identifier of a second clock source node and/or a second maximum clock deviation accumulated value; comparing, by the network device, the identifier of the first clock source node with the identifier of the second clock source node; selecting, by the network device from the first master clock node and/or the second master clock node based on the first maximum clock deviation accumulated value and/or the second maximum clock deviation accumulated value, a master clock node for clock synchronization when the identifier of the first clock source node is the same as the identifier of the second clock source node; and/or calibrating, by the network device, a clock of the network device based on time information of the selected master clock node.

In some embodiments, the network device may be a device connected to at least two master clock nodes in a clock synchronization network. In some embodiments, announce messages are defined by the precision time protocol (PTP). In some embodiments, the identifier of the first clock source node is an identifier used to uniquely indicate the first clock source node. In some embodiments, the identifier of the second clock source node is an identifier used to uniquely indicate the second clock source node. In some embodiments, the first maximum clock deviation accumulated value is a sum of a plurality of first maximum clock deviations on a path from the first clock source node to the first master clock node, and/or the second maximum clock deviation accumulated value is a sum of a plurality of second maximum clock deviations on a path from the second clock source node to the second master clock node. In some embodiments, calibrating the clock of the network device is setting a parameter of the clock of the network device to be the same as that of a clock of the selected master clock node. In some embodiments, the parameter of the clock may be a time of the clock, a frequency of the clock, or a time and/or a frequency of the clock.

In this embodiment of this application, the network device may first compare the identifier of the first clock source node with the identifier of the second clock source node. In some embodiments, when the identifier of the first clock source node is the same as the identifier of the second clock source node, it indicates that the first master clock node and/or the second master clock node correspond to a same clock source node. In some embodiments, the network device selects, from the first master clock node and the second master clock node based on the first maximum clock deviation accumulated value and/or the second maximum clock deviation accumulated value, the master clock node for clock synchronization. In some embodiments, the network device calibrates the clock of the network device based on the time information of the selected master clock node.

In some embodiments, the plurality of first maximum clock deviations are a plurality of maximum clock deviations corresponding to a plurality of clock nodes on the path from the first clock source node to the first master clock node, and/or the plurality of second maximum clock deviations are a plurality of maximum clock deviations corresponding to a plurality of clock nodes on the path from the second clock source node to the second master clock node.

In some embodiments, there may be a plurality of paths between the first clock source node and/or the first master clock node, and/or the plurality of clock nodes on the path from the first clock source node to the first master clock node may be a plurality of clock nodes on the plurality of paths. In some embodiments, there may be a plurality of paths between the second clock source node and/or the second master clock node, and/or the plurality of clock nodes on the path from the second clock source node to the second master clock node may be a plurality of clock nodes on the plurality of paths. In some embodiments, the plurality of clock nodes on the path from the first clock source node to the first master clock node may include the first master clock node, but do not include the first clock source node. In some embodiments, the plurality of clock nodes on the path from the second clock source node to the second master clock node may include the second master clock node, but do not include the second clock source node.

In some embodiments, the selecting, by the network device from the first master clock node and/or the second master clock node based on the first maximum clock deviation accumulated value and/or the second maximum clock deviation accumulated value, a master clock node for clock synchronization includes: comparing, by the network device, the first maximum clock deviation accumulated value with the second maximum clock deviation accumulated value; and/or determining (e.g., identifying), by the network device, the first master clock node as the master clock node for clock synchronization when the first maximum clock deviation accumulated value is less than the second maximum clock deviation accumulated value.

In some embodiments, the first maximum clock deviation accumulated value is compared with the second maximum clock deviation accumulated value. In some embodiments, when the first maximum clock deviation accumulated value is less than the second maximum clock deviation accumulated value, it indicates that precision of clock synchronization performed by using the first master clock node is higher than that of clock synchronization performed by using the second master clock node. In some embodiments, the network device determines the first master clock node as the master clock node for clock synchronization, so that precision of clock synchronization performed by the network device can be higher. In some embodiments, when the first maximum clock deviation accumulated value is greater than the second maximum clock deviation accumulated value, it indicates that precision of clock synchronization performed by using the second master clock node is higher than that of clock synchronization performed by using the first master clock node. In some embodiments, the network device can determine the second master clock node as the master clock node for clock synchronization, so that precision of clock synchronization performed by the network device can be higher.

In some embodiments, a smaller clock deviation brought by a path from a clock source node to a master clock node indicates higher precision of clock synchronization performed by using the master clock node. In some embodiments, the first maximum clock deviation accumulated value of the first master clock node may be compared with the second maximum clock deviation accumulated value of the second master clock node, and/or a master clock node corresponding to the smaller of the first maximum clock deviation accumulated value and/or the second maximum clock deviation accumulated value may be selected as the master clock node for clock synchronization by the network device, so that the network device can perform (e.g., execute, implement) more precise clock synchronization, and/or precision of a clock calibrated by the network device is higher.

In some embodiments, the announce message from the first master clock node carries a first clock variance value, and/or the announce message from the second master clock node carries a second clock variance value. In some embodiments, after the comparing, by the network device, the first maximum clock deviation accumulated value with the second maximum clock deviation accumulated value, the method includes: comparing, by the network device, the first clock variance value with the second clock variance value when the first maximum clock deviation accumulated value is equal to the second maximum clock deviation accumulated value; and/or determining, by the network device, the first master clock node as the master clock node for clock synchronization when the first clock variance value is less than the second clock variance value.

In some embodiments, the first clock variance value is a square root of a sum of squares of a plurality of first clock deviation variance values. The second clock variance value is a square root of a sum of squares of a plurality of second clock deviation variance values. In some embodiments, the first clock deviation variance value is a variance value of a plurality of clock deviations corresponding to one clock node on the path from the first clock source node to the first master clock node. In some embodiments, the second clock deviation variance value is a variance value of a plurality of clock deviations corresponding to one clock node on the path from the second clock source node to the second master clock node.

In some embodiments, when the first clock variance value is less than the second clock variance value, it indicates that the precision of clock synchronization performed by using the first master clock node is higher than that of clock synchronization performed by using the second master clock node. In some embodiments, the network device determines the first master clock node as the master clock node for clock synchronization, so that precision of clock synchronization performed by the network device can be higher. In some embodiments, when the first clock variance value is greater than the second clock variance value, it indicates that the precision of clock synchronization performed by using the second master clock node is higher than that of clock synchronization performed by using the first master clock node. In some embodiments, the network device can determine the second master clock node as the master clock node for clock synchronization, so that precision of clock synchronization performed by the network device can be higher.

In some embodiments, the plurality of first maximum clock deviations are a plurality of maximum clock deviations corresponding to a plurality of clock nodes on the path from the first clock source node to the first master clock node, and/or at least one maximum clock deviation corresponding to a transmission medium between at least one pair of adjacent clock nodes in the plurality of clock nodes on the path from the first clock source node to the first master clock node. In some embodiments, the plurality of second maximum clock deviations are a plurality of maximum clock deviations corresponding to a plurality of clock nodes on the path from the second clock source node to the second master clock node, and/or at least one maximum clock deviation corresponding to a transmission medium between at least one pair of adjacent clock nodes in the plurality of clock nodes on the path from the second clock source node to the second master clock node.

In some embodiments, the pair of adjacent clock nodes on the path from the first clock source node to the first master clock node are two clock nodes that can directly exchange announce messages on the path from the first clock source node to the first master clock node. In some embodiments, a pair of adjacent clock nodes on the path from the second clock source node to the second master clock node are two clock nodes that can directly exchange announce messages on the path from the second clock source node to the second master clock node.

In some embodiments, the selecting, by the network device from the first master clock node and/or the second master clock node based on the first maximum clock deviation accumulated value and/or the second maximum clock deviation accumulated value, a master clock node for clock synchronization includes: determining (e.g., measuring, calculating, estimating), by the network device, a third maximum clock deviation accumulated value and/or a fourth maximum clock deviation accumulated value; comparing, by the network device, the third maximum clock deviation accumulated value with the fourth maximum clock deviation accumulated value; and/or determining, by the network device, the first master clock node as the master clock node for clock synchronization when the third maximum clock deviation accumulated value is less than the fourth maximum clock deviation accumulated value.

In some embodiments, third maximum clock deviation accumulated value is a sum of a maximum clock deviation corresponding to a transmission medium between the first master clock node and/or the network device and/or the first maximum clock deviation accumulated value. In some embodiments, the fourth maximum clock deviation accumulated value is a sum of a maximum clock deviation corresponding to a transmission medium between the second master clock node and/or the network device and/or the second maximum clock deviation accumulated value.

In some embodiments, when the third maximum clock deviation accumulated value is less than the fourth maximum clock deviation accumulated value, it indicates that precision of clock synchronization performed by using the first master clock node is higher than that of clock synchronization performed by using the second master clock node. In some embodiments, the network device determines the first master clock node as the master clock node for clock synchronization, so that precision of clock synchronization performed by the network device can be higher. In some embodiments, when the third maximum clock deviation accumulated value is greater than the fourth maximum clock deviation accumulated value, it indicates that the precision of clock synchronization performed by using the second master clock node is higher than that of clock synchronization performed by using the first master clock node. In some embodiments, the network device determines the second master clock node as the master clock node for clock synchronization, so that precision of clock synchronization performed by the network device can be higher.

In some embodiments, the announce message from the first master clock node carries a first clock variance value, and/or the announce message from the second master clock node carries a second clock variance value. In some embodiments, the first clock variance value is a square root of a sum of squares of a plurality of first clock deviation variance values. In some embodiments, the second clock variance value is a square root of a sum of squares of a plurality of second clock deviation variance values. The plurality of first clock deviation variance values include a variance value of a plurality of clock deviations corresponding to each clock node on the path from the first clock source node to the first master clock node, and/or a variance value of a plurality of clock deviations corresponding to a transmission medium between each pair of adjacent clock nodes in at least one pair of adjacent clock nodes in the plurality of clock nodes on the path from the first clock source node to the first master clock node. In some embodiments, the plurality of second clock deviation variance values include a variance value of a plurality of clock deviations corresponding to each clock node on the path from the second clock source node to the second master clock node, and/or a variance value of a plurality of clock deviations corresponding to a transmission medium between each pair of adjacent clock nodes in at least one pair of adjacent clock nodes in the plurality of clock nodes on the path from the second clock source node to the second master clock node. In some embodiments, after the comparing, by the network device, the third maximum clock deviation accumulated value with the fourth maximum clock deviation accumulated value, the method includes: determining, by the network device, a third clock variance value and/or a fourth clock variance value when the third maximum clock deviation accumulated value is equal to the fourth maximum clock deviation accumulated value; comparing, by the network device, the third clock variance value with the fourth clock variance value; and/or determining, by the network device, the first master clock node as the master clock node for clock synchronization when the third clock variance value is less than the fourth clock variance value.

In some embodiments, the third clock variance value is a square root of a sum of squares of a variance value of a plurality of clock deviations corresponding to the transmission medium between the first master clock node and/or the network device and/or the first clock variance value. In some embodiments, the fourth clock variance value is a square root of a sum of squares of a variance value of a plurality of clock deviations corresponding to the transmission medium between the second master clock node and/or the network device and/or the second clock variance value.

In some embodiments, when the third clock variance value is less than the fourth clock variance value, it indicates that precision of clock synchronization performed by using the first master clock node is higher than that of clock synchronization performed by using the second master clock node. In some embodiments, the network device determines the first master clock node as the master clock node for clock synchronization, so that precision of clock synchronization performed by the network device can be higher. In some embodiments, when the third clock variance value is greater than the fourth clock variance value, it indicates that precision of clock synchronization performed by using the second master clock node is higher than that of clock synchronization performed by using the first master clock node. In some embodiments, the network device determines the second master clock node as the master clock node for clock synchronization, so that precision of clock synchronization performed by the network device can be higher.

In some embodiments, the announce message from the first master clock node carries a first priority of the first clock source node and/or a first maximum clock source deviation. In some embodiments, the announce message from the second master clock node carries a first priority of the second clock resource node and/or a second maximum clock source deviation. In some embodiments, after the comparing, by the network device, the identifier of the first clock source node with the identifier of the second clock source node, the method includes: comparing, by the network device, the first priority of the first clock source node with the first priority of the second clock source node when the identifier of the first clock source node is different from the identifier of the second clock source node; comparing, by the network device, the first maximum clock source deviation with the second maximum clock source deviation when the first priority of the first clock source node is equal to the first priority of the second clock source node; determining, by the network device, the first master clock node as a master clock node for clock synchronization when the first maximum clock source deviation is less than the second maximum clock source deviation; and/or calibrating, by the network device, the clock of the network device based on time information of the first master clock node.

In some embodiments, the first priority is used to indicate a priority level of a clock source node, and/or a smaller value of the first priority indicates a higher priority level of a clock source node corresponding to the first priority value. In some embodiments, when the first priority of the first clock source node is equal to the first priority of the second clock source node, it indicates that the priority level of the first clock source node is the same as the priority level of the second clock source node. In some embodiments, the first maximum clock source deviation is a maximum clock deviation corresponding to the first clock source node. In some embodiments, the second maximum clock source deviation is a maximum clock deviation corresponding to the second clock source node.

In some embodiments, when the first maximum clock source deviation is less than the second maximum clock source deviation, it indicates that precision of the first clock source node is higher than that of the second clock source node. In some embodiments, the network device determines that the first master clock node that is on the same path as the first clock source node is the master clock node for clock synchronization, so that precision of clock synchronization performed by the network device can be higher. In some embodiments, when the first maximum clock source deviation is greater than the second maximum clock source deviation, it indicates that precision of the second clock source node is higher than that of the first clock source node. In some embodiments, the network device determines that the second master clock node that is on the same path as the second clock source node is the master clock node for clock synchronization, so that precision of clock synchronization performed by the network device can be higher.

In some embodiments, the announce message from the first master clock node carries a first clock source variance value, and/or the announce message from the second master clock node carries a second clock source variance value. After the comparing, by the network device, the first maximum clock source deviation with the second maximum clock source deviation, the method includes: comparing, by the network device, the first clock source variance value with the second clock source variance value when the first maximum clock source deviation is equal to the second maximum clock source deviation; determining, by the network device, that the first master clock node is the master clock node for clock synchronization when the first clock source variance value is less than the second clock source variance value; and/or calibrating, by the network device, the clock of the network device based on the time information of the first master clock node.

In some embodiments, the first clock source variance value is a variance value of a plurality of clock deviations corresponding to the first clock source node. In some embodiments, the second clock source variance value is a variance value of a plurality of clock deviations corresponding to the second clock source node.

In some embodiments, when the first clock source variance value is less than the second clock source variance value, it indicates that the precision of the first clock source node is higher than that of the second clock source node. In this case, the network device determines that the first master clock node that is on the same path as the first clock source node is the master clock node for clock synchronization, so that precision of clock synchronization performed by the network device can be higher. In some embodiments, when the first clock source variance value is greater than the second clock source variance value, it indicates that the precision of the second clock source node is higher than that of the first clock source node. In some embodiments, the network device determines that the second master clock node that is on the same path as the second clock source node is the master clock node for clock synchronization, so that precision of clock synchronization performed by the network device can be higher.

In some embodiments (sometimes referred to as, a second aspect), a clock synchronization apparatus is provided, where the clock synchronization apparatus has a function of implementing behavior of the clock synchronization method in the first aspect. In some embodiments, the clock synchronization apparatus includes at least one module, and/or the at least one module (e.g., device, one or more circuits) is configured to implement the clock synchronization method provided in the first aspect.

In some embodiments (sometimes referred to as, a third aspect), a clock synchronization apparatus is provided. The structure of the clock synchronization apparatus includes a processor and/or a memory. In some embodiments, the memory is configured to store a program that supports the clock synchronization apparatus in performing the clock synchronization method provided in the first aspect, and/or store data used to implement the clock synchronization method in the first aspect. In some embodiments, the processor is configured to execute a program stored in the memory. In some embodiments, the clock synchronization apparatus may include a communication bus, and/or the communication bus is configured to establish a connection between the processor and/or the memory.

In some embodiments (sometimes referred to as, a fourth aspect), a computer-readable storage medium is provided. The computer-readable storage medium stores instructions that, when executed on a computer, enable the computer to perform the clock synchronization method in the first aspect.

In some embodiments (sometimes referred to as, a fifth aspect), a computer program product including instructions is provided. In some embodiments, the instructions, when executed on a computer, enable the computer to perform the clock synchronization method in the first aspect.

Technical effects obtained through the second aspect, the third aspect, the fourth aspect, and/or the fifth aspect are similar to that obtained by using corresponding technical means in the first aspect. Details are not described herein again.

The technical solutions provided in this application may bring at least the following beneficial effects: In some embodiments, the network device first receives the announce message from the first master clock node and/or the announce message from the second master clock node, where the announce message from the first master clock node carries the identifier of the first clock source node and/or the first maximum clock deviation accumulated value, and/or the announce message from the second master clock node carries the identifier of the second clock source node and/or the second maximum clock deviation accumulated value. In some embodiments, the network device compares the identifier of the first clock source node with the identifier of the second clock source node. In some embodiments, when the identifier of the first clock source node is the same as the identifier of the second clock source node, it indicates that the first master clock node and/or the second master clock node correspond to a same clock source node. In some embodiments, the first maximum clock deviation accumulated value and/or the second maximum clock deviation accumulated value help select, from the first master clock node and/or the second master clock node, a master clock node with a relatively small clock deviation brought by a path from the clock source node to the master clock node. In some embodiments, the clock of the network device is calibrated based on the time information of the selected master clock node. In some embodiments, if the clock deviation brought by the path from the clock source node to the master clock node is relatively small, the precision of clock synchronization performed by using the master clock node is higher, so that the precision of a clock calibrated by the network device is higher.

BRIEF DESCRIPTION OF DRAWINGS

FIG. 2 is a schematic structural diagram of a network device according to an embodiment of this application;

FIG. 3 is a flowchart of a first clock synchronization method according to an embodiment of this application;

DESCRIPTION OF EMBODIMENTS

To make the objectives, technical solutions, and advantages of this application clearer, the following further describes the implementations of this application in detail with reference to the accompanying drawings.

Before the embodiments of this application are described in detail, an implementation environment of the embodiments of this application is first described.

Figure 1:
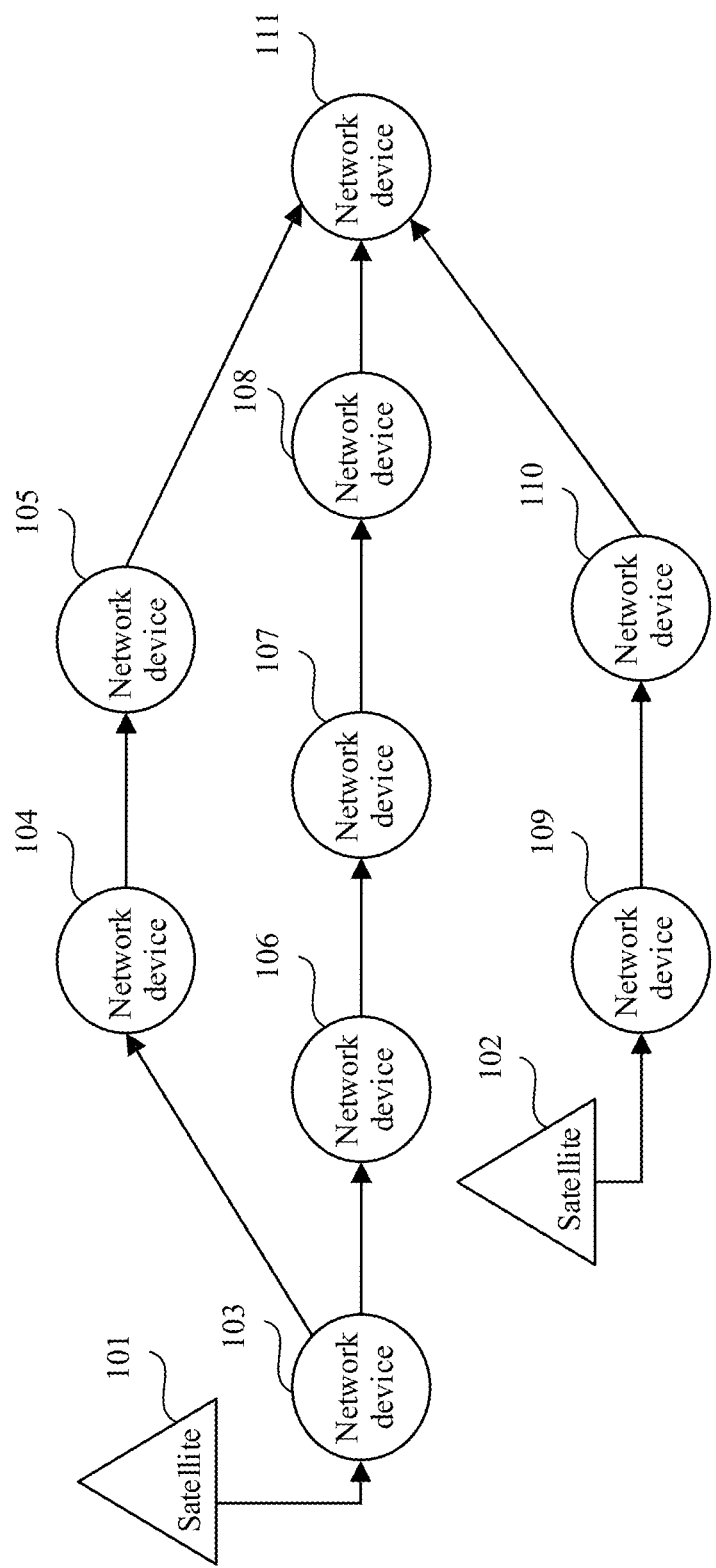
FIG. 1 is a schematic diagram of an implementation environment according to an embodiment of this application.

FIG. 1 is a schematic diagram of an implementation environment according to an embodiment of this application. Referring to FIG. 1, the implementation environment includes a satellite 101, a satellite 102, and network devices 103 to 111. The satellite 101, the satellite 102, and the network devices 103 to 111 form a clock synchronization network. The satellite 101 transmits time information to the network device 103 by using a satellite signal, and the satellite 102 transmits time information to the network device 109 by using a satellite signal. The network devices 103 to 111 may be connected by an optical fiber, and transmit the time information by the optical fiber. Both the satellite 101 and the satellite 102 may be a global positioning system (GPS), a global navigation satellite system (GLONASS), a BeiDou navigation satellite system, or the like. The network devices 103 to 111 may be a provider router, a provider edge router, a customer edge router, or the like.

The satellite 101 and the satellite 102 are located in the upstream of the clock synchronization network, and the network device 111 is located in the downstream of the clock synchronization network. The satellite 101 may implement clock synchronization with the network device 103 by sending (e.g., transmitting, providing, delivering) a clock signal to the network device 103. Similarly, the satellite 102 may implement clock synchronization with the network device 109 by sending a clock signal to the network device 109.

In some embodiments, taking the satellite 101 and the network device 103 as an example, when the satellite 101 is a GPS, the satellite 101 may include an atomic clock. The network device 103 may include a building integrated timing supply (BITS) clock, and the BITS clock includes a GPS receiver. Driven by the atomic clock, the satellite 101 may send a GPS signal to the network device 103. The GPS signal may include time information whose precision is the same as that of the atomic clock. After receiving the GPS signal, the GPS receiver of the BITS clock in the network device 103 may perform clock synchronization between the BITS clock in the network device 103 and the atomic clock in the GPS satellite based on the time information in the GPS signal. Clock synchronization includes time synchronization and frequency synchronization. In some embodiments, the network device 103 may synchronize a time of a BITS clock in the network device 103 with a time of an atomic clock in a GPS satellite, and the network device 103 may synchronize a frequency of a BITS clock in the network device 103 with a frequency of an atomic clock in a GPS satellite. After the network device 103 performs clock synchronization with the satellite 101, the network device 103 may be used as a time source node. Similarly, by using the foregoing method, clock synchronization may be performed between the network device 109 and the satellite 102, and the network device 109 on which clock synchronization is performed is used as another clock source node.

As a time source node, the network device 103 may perform clock synchronization between the network device 104 and the network device 106 that are downstream to the network device 103 and the network device 103. In some embodiments, taking the network device 103 and the network device 104 as an example, the network device 103 may send a synchronization (Sync) message to the network device 104 located in the downstream of the network device 103, where a timestamp 1 indicating a sending time of the Sync message is recorded in the Sync message. When receiving the Sync message, the network device 104 locally records, in the network device 104, a timestamp 2 indicating a receiving time of the Sync message, and then the network device 104 sends a delay request (Delay_req) message to the network device 103, and the network device 104 locally records the timestamp 3 indicating the sending time of the Delay_req message. When the network device 103 receives the Delay_req message, the network device 103 locally records a timestamp 4 indicating a receiving time of the Delay_req message, and finally, the network device 103 generates a delay response (Delay_resp) message carrying the timestamp 4 and sends the Delay_resp message to the network device 104. In this case, the network device 104 may obtain the timestamp 1 for sending the Sync message by the network device 103, the timestamp 2 for receiving the Sync message by the network device 104, the timestamp 3 for sending the Delay_req message by the network device 104, and the timestamp 4 for receiving the Delay_req message by the network device 103. The network device 104 may determine a frequency deviation between the network device 104 and the network device 103 by using the timestamp 1 and the timestamp 2, and perform frequency synchronization with the network device 103 based on the frequency deviation. In addition, the network device 104 may determine a time deviation between the network device 104 and the network device 103 by using the timestamp 1, the timestamp 2, the timestamp 3, and the timestamp 4, and perform time synchronization with the network device 103 based on the time deviation. In other words, clock synchronization with the network device 103 is implemented.

Similarly, after the network device 104 performs clock synchronization with the network device 103, the network device 104 may be used as a master clock node, so that the network device 105 located in the downstream of the network device 104 performs clock synchronization with the network device 104, and so on.

The network device 111 is located in the downstream of the network device 105, the network device 108, and the network device 110. Therefore, the network device 105, the network device 108, and the network device 110 may all be used as master clock nodes of the network device 111. The network device 111 may receive three announce messages from the network device 105, the network device 108, and the network device 110, where the three announce messages all carry the identifier of the upstream clock source node of the master clock node, the maximum clock deviation accumulated value of the master clock node, and the hop count from the master clock node to the upstream clock source node. That is, the announce message sent by the network device 105 carries the identifier of the network device 103, the maximum clock deviation accumulated value of the network device 105, and the hop count from the network device 105 to the network device 103; the announce message sent by the network device 108 carries the identifier of the network device 103, the maximum clock deviation accumulated value of the network device 108 and the hop count from the network device 108 to the network device 103; and the announce message sent by the network device 110 carries the identifier of the network device 109, the maximum clock deviation accumulated value of the network device 110, and the hop count from the network device 110 to the network device 109. The network device 111 may select, from the network device 105, the network device 108, and the network device 110 based on data carried in the three announce messages, a network device that can perform clock synchronization. Similarly, according to a process of performing clock synchronization between the network device 104 and the network device 103, clock synchronization between the network device 111 and the network device that is selected to perform clock synchronization may be implemented.

FIG. 2 is a schematic structural diagram of a network device according to an embodiment of this application. The network device may be any one of the network devices 103 to 111 shown in FIG. 1. Referring to FIG. 2, the network device includes at least one processor 201, a communication bus 202, a memory 203, at least one communications interface 204, and a clock 205.

The processor 201 may be a general-purpose central processing unit (CPU), a microprocessor, an application-specific integrated circuit (ASIC), or may be one or more integrated circuits configured to control program execution in the solutions of this application.

The communication bus 202 may include a path used to transmit information between the foregoing components.

The memory 203 may be a read-only memory (ROM) or another type of static storage device that can store static information and instructions, or may be a random access memory (RAM) or another type of dynamic storage device that can store information and instructions, or may be an electrically erasable programmable read-only memory (EEPROM), a Compact Disc Read-Only Memory (CD-ROM) or another optical disc storage, an optical disc storage (e.g., a compact disc, a laser disc, an optical disc, a digital versatile disc, a Blu-ray disc, and the like), a magnetic disk storage medium, or another magnetic storage device, or any other medium that can be used to carry or store expected program code in a form of an instruction or a data structure and that can be accessed by the network device, but is not limited thereto. The memory 203 may exist independently, and is connected to the processor 201 by the communication bus 202. In some embodiments, the memory 203 may be integrated with the processor 201.

The communications interface 204 uses any apparatus such as a transceiver, and is configured to communicate with another device or a communications network, for example, an Ethernet, a radio access network (RAN), or a wireless local area network (WLAN).

The clock 205 may be a BITS clock, and the BITS clock may include a GPS receiver.

In some embodiments, the processor 201 may include one or more CPUs, for example, a CPU 0 and a CPU 1 shown in FIG. 2.

In some embodiments, the network device may include a plurality of processors, for example, a processor 201 and a processor 206 shown in FIG. 2. Each of these processors may be a single-core processor (single-CPU), or may be a multi-core processor (multi-CPU). The processor herein may be one or more devices, circuits, and/or processing cores configured to process data.

In some embodiments, the network device may include an output device 207 and an input device 208 (not shown in FIG. 2). The output device 207 communicates with the processor 201, and may display information in a plurality of manners. For example, the output device 207 may be a liquid crystal display (LCD), a light emitting diode (LED) display device, a cathode ray tube (CRT) display device, or a projector and so on. The input device 208 communicates with the processor 201, and may receive an input of a user in a plurality of manners. For example, the input device 208 may be a mouse, a keyboard, a touchscreen device, or a sensing device.

The network device may be a general-purpose network device or a dedicated network device. In some embodiments, the network device may be a router, a switch, or the like. The type of the network device is not limited in the embodiments of this application.

The memory 203 is configured to store program code 210 for executing the solutions of this application, and the processor 201 is configured to execute the program code 210 stored in the memory 203. The network device may implement, by using the processor 201 and the program code 210 in the memory 203, the clock synchronization method provided in the following embodiment in FIG. 3.

FIG. 3 is a flowchart of a first clock synchronization method according to an embodiment of this application. The method is applied to a network device. Referring to FIG. 3, the method includes S301 to S304.

S301: A network device receives an announce message from a first master clock node and an announce message from a second master clock node, where the announce message from the first master clock node carries an identifier of a first clock source node and a first maximum clock deviation accumulated value, the announce message from the second master clock node carries an identifier of a second clock source node and a second maximum clock deviation accumulated value.

It should be noted that the network device may be a device connected to at least two master clock nodes in a clock synchronization network. For example, the network device may be the network device 111 in FIG. 2. The first master clock node and the second master clock node are clock nodes that are connected to the network device and that are located in the upstream of the network device. Announce messages are defined by PTP. The identifier of the first clock source node is an identifier used to uniquely indicate the first clock source node. The identifier of the second clock source node is an identifier used to uniquely indicate the second clock source node.

In addition, the first maximum clock deviation accumulated value is a sum of a plurality of first maximum clock deviations on a path from the first clock source node to the first master clock node, and the second maximum clock deviation accumulated value is a sum of a plurality of second maximum clock deviations on a path from the second clock source node to the second master clock node.

In some embodiments (sometimes referred to as, a first case), on a path from the clock source node to the master clock node, a clock deviation may exist only on a clock node. Therefore, the plurality of first maximum clock deviations may be a plurality of maximum clock deviations corresponding to a plurality of clock nodes on the path from the first clock source node to the first master clock node, and the plurality of second maximum clock deviations may be a plurality of maximum clock deviations corresponding to a plurality of clock nodes on the path from the second clock source node to the second master clock node. In other words, each clock node on the path from the first clock source node to the first master clock node corresponds to a maximum clock deviation, and the maximum clock deviation is referred to as a first maximum clock deviation. Similarly, each clock node on the path from the second clock source node to the second master clock node also corresponds to a maximum clock deviation, and the maximum clock deviation is referred to as a second maximum clock deviation.

The clock node may generally include a plurality of master communications interfaces and a plurality of slave communications interfaces. The plurality of slave communications interfaces may communicate with a plurality of master clock nodes according to the 1588v2 protocol. The plurality of master communications interfaces may separately communicate with a plurality of slave clock nodes located in the downstream according to the 1588v2 protocol. A plurality of master communications interfaces are used as examples for description herein below. When one of the plurality of master communications interfaces of the clock node is faulty, a slave clock node that communicates with the master communications interface cannot implement clock synchronization with the clock node by using the master communications interface. In this case, the slave clock node needs to communicate with another master communications interface included in the clock node, so that clock synchronization with the clock node can be implemented by using the another master communications interface. In this case, the clock node may generate a jump amplitude deviation because the slave clock node communicates with another master communications interface. In other words, precision of clock synchronization between the slave clock node and the clock node when the slave clock node communicates with the original master communications interface is higher than that of clock synchronization between the slave clock node and the clock node when the slave clock node communicates with another master communications interface. Certainly, for a clock node, there may not exist a case in which a communications interface is faulty and the clock node that needs to communicate with the communications interface needs to communicate with another communications interface. Therefore, the jump amplitude deviation is not an inevitable deviation existing in the clock node. In addition, in a natural environment in which a clock node is located, jitter is inevitably caused due to an uncertain factor of each device, and consequently, a jitter deviation is generated. In addition, the clock node inevitably generates a static deviation in a use process because of a design process of each device. The jump amplitude deviation, the jitter deviation, and the static deviation of the clock node are all clock deviations of the clock node. The three clock deviations may be detected at a plurality of different sampling moments before the clock node is delivered from a factory, to obtain a maximum value used to evaluate the precision of the clock node. For example, 100 jump amplitude deviations and 100 jitter deviations in 100 sampling moments may be obtained before the clock node is delivered from a factory. A maximum value of the 100 jump amplitude deviations is obtained, and a maximum jump amplitude deviation is obtained. An absolute value of a difference between an upper limit and a lower limit of a jitter deviation range formed by the 100 jitter deviations is taken as a maximum jitter deviation. An intermediate value of the jitter deviation range formed by the 100 jitter deviations is taken as a maximum static deviation. The maximum jump amplitude deviation, the maximum jitter deviation, and the maximum static deviation of a clock node can be saved in the clock node before delivered from a factory. When the communications interface of the clock node is faulty and the clock node that communicates with the communications interface needs to communicate with another communications interface, the maximum clock deviation value is a sum of the maximum jump amplitude deviation, the maximum jitter deviation, and the maximum static deviation. When the master communications interface of the clock node is not changed, the maximum clock deviation is the sum of the maximum jitter deviation and the maximum static deviation.

Based on the foregoing description, for each clock node on the path from the first clock source node to the first master clock node, a maximum clock deviation corresponding to the clock node may be a sum of a maximum jump amplitude deviation, a maximum jitter deviation, and a maximum static deviation, or may be a sum of a maximum jitter deviation and a maximum static deviation. Similarly, for each clock node on the path from the second clock source node to the second master clock node, a maximum clock deviation corresponding to the clock node may be a sum of a maximum jump amplitude deviation, a maximum jitter deviation, and a maximum static deviation, or may be a sum of a maximum jitter deviation and a maximum static deviation.

The first maximum clock deviation accumulated value in the first case is described herein below by way of example.

For example, taking the network device 111 in FIG. 1 as an example, the network device 105 is the first master clock node. In this case, the network device 103 is the first clock source node. A path from the network device 103 to the network device 105 includes the network device 104. The network device 104 corresponds to a maximum clock deviation 104, and the network device 105 corresponds to a maximum clock deviation 105. In other words, there are two first maximum clock deviations on the path from the network device 103 to the network device 105, that is, the maximum clock deviation 104 and the maximum clock deviation 105. In this way, the first maximum clock deviation accumulated value is a sum of the maximum clock deviation 104 and the maximum clock deviation 105.

It should be noted that there may be a plurality of paths between the first clock source node and the first master clock node, and the plurality of clock nodes on the path from the first clock source node to the first master clock node may be a plurality of clock nodes on the plurality of paths. Similarly, there may be a plurality of paths between the second clock source node and the second master clock node, and the plurality of clock nodes on the path from the second clock source node to the second master clock node may be a plurality of clock nodes on the plurality of paths. In addition, the plurality of clock nodes on the path from the first clock source node to the first master clock node may include the first master clock node, but do not include the first clock source node. Similarly, the plurality of clock nodes on the path from the second clock source node to the second master clock node may include the second master clock node, but do not include the second clock source node.

In some embodiments (sometimes referred to as, a second case), on the path from the clock source node to the master clock node, in addition to that a clock deviation exists in the clock node, a corresponding clock deviation may exist in a transmission medium between two adjacent clock nodes. Therefore, the plurality of first maximum clock deviations may be a plurality of maximum clock deviations corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node. The plurality of second maximum clock deviations may be a plurality of maximum clock deviations corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node. That is, each clock node on the path from the first clock source node to the first master clock node corresponds to a maximum clock deviation, and a transmission medium between each pair of adjacent clock nodes in the at least one pair of adjacent clock nodes also corresponds to a maximum clock deviation, which may be referred to as a first maximum clock deviation. Similarly, each clock node on the path from the second clock source node to the second master clock node corresponds to a maximum clock deviation, and a transmission medium between each pair of adjacent clock nodes in the at least one pair of adjacent clock nodes also corresponds to a maximum clock deviation, which may be referred to as a second maximum clock deviation.

It should be noted that the pair of adjacent clock nodes on the path from the first clock source node to the first master clock node are two clock nodes that can directly exchange announce messages on the path from the first clock source node to the first master clock node. Similarly, a pair of adjacent clock nodes on the path from the second clock source node to the second master clock node are two clock nodes that can directly exchange announce messages on the path from the second clock source node to the second master clock node. For example, the network device 104 and the network device 105 in FIG. 1 may be referred to as a pair of adjacent clock nodes. A transmission medium between adjacent clock nodes may be an optical fiber. Because the optical fiber is affected by factors such as temperature, humidity, and pressure, a delay in performing clock synchronization between a pair of adjacent clock nodes may be affected. Consequently, a clock deviation exists in the transmission medium between the adjacent clock nodes.

The first maximum clock deviation accumulated value in the second case is described herein below by way of example.

For example, taking the network device 111 in FIG. 1 as an example, the network device 105 is the first master clock node. In this case, the network device 103 is the first clock source node. A path from the network device 103 to the network device 105 includes the network device 104. The network device 104 corresponds to the maximum clock deviation 104, the network device 105 corresponds to the maximum clock deviation 105, and the transmission medium n between the network device 104 and the network device 105 corresponds to the maximum clock deviation n. In other words, there are three first maximum clock deviations on a path from the network device 103 to the network device 105, that is, the maximum clock deviation 104, the maximum clock deviation 105, and the maximum clock deviation n. In this way, the first maximum clock deviation accumulated value is a sum of the maximum clock deviation 104, the first maximum clock deviation 105, and the first maximum clock deviation n.

It should be noted that when the transmission medium between each pair of adjacent clock nodes in the plurality of clock nodes on the path from the first clock source node to the first master clock node is in an ideal state, that is, a clock deviation is not generated on the transmission medium between each pair of adjacent clock nodes due to factors such as temperature, humidity, and pressure, under such a condition, the plurality of first maximum clock deviations are a plurality of maximum clock deviations corresponding to the plurality of clock nodes on the path from the first clock source node to the first master clock node.

In addition, for a transmission medium between a pair of adjacent clock nodes, a detection instrument may be disposed at each of the two adjacent clock nodes in advance, to detect a clock deviation generated by forward and reverse transmission of time information of the transmission medium between the two clock nodes. Similar to the foregoing clock node, detection may be performed at a plurality of different sampling moments, and then a maximum value of detected clock deviations is taken as the maximum clock deviation of the transmission medium between the two adjacent clock nodes. In addition, the maximum clock deviation of the transmission medium between the two adjacent clock nodes is saved to any one of the two adjacent clock nodes.

S302: The network device compares the identifier of the first clock source node with the identifier of the second clock source node.

In some embodiments, it is required that all clock nodes in the entire clock synchronization network trace a same clock source node, so that all the clock nodes in the entire clock synchronization network correspond to a same clock source node. Therefore, the identifier of the first clock source node is first compared with the identifier of the second clock source node to determine whether the clock source nodes of the first master clock node and the second master clock node are the same. If the clock source nodes of the first master clock node and the second master clock node are the same, it can be ensured that all clock nodes in the clock synchronization network trace a same clock source node, and then a master clock node that can perform clock synchronization with the network device is selected by the following S303.

S303: When the identifier of the first clock source node is the same as the identifier of the second clock source node, the network device selects, from the first master clock node and the second master clock node based on the first maximum clock deviation accumulated value and the second maximum clock deviation accumulated value, a master clock node for clock synchronization.

It should be noted that when the identifier of the first clock source node is the same as the identifier of the second clock source node, it indicates that the first master clock node and the second master clock node correspond to a same clock source node. In this case, the clock source node does not become a factor that affects selecting, by the network device from the first master clock node and the second master clock node, a master clock node for clock synchronization. Therefore, the master clock node for clock synchronization may be selected from the first master clock node and the second master clock node according to the first maximum clock deviation accumulated value and the second maximum clock deviation accumulated value.

Based on the foregoing description of S301, in the two different cases, concepts of the first clock deviation accumulated value and the second clock deviation accumulated value are different. In this case, an embodiment of selecting, from the first master clock node and the second master clock node based on the first maximum clock deviation accumulated value and the second maximum clock deviation accumulated value, a master clock node for clock synchronization may also be different. Therefore, the selection of the master clock node may also be described in two possible implementations herein below. The first possible implementation corresponds to the first case in S301, and the second possible implementation corresponds to the foregoing second case in S301.

In a first possible implementation, the network device compares the first maximum clock deviation accumulated value with the second maximum clock deviation accumulated value, and when the first maximum clock deviation accumulated value is less than the second maximum clock deviation accumulated value, the network device determines the first master clock node as the master clock node for clock synchronization. When the first maximum clock deviation accumulated value is greater than the second maximum clock deviation accumulated value, the network device determines the second master clock node as the master clock node for clock synchronization.

It should be noted that when the first maximum clock deviation accumulated value is less than the second maximum clock deviation accumulated value, it indicates that the precision of clock synchronization performed by using the first master clock node is higher than that of clock synchronization performed by using the second master clock node. In this case, the network device determines the first master clock node as the master clock node for clock synchronization, so that precision of clock synchronization performed by the network device can be higher. When the first maximum clock deviation accumulated value is greater than the second maximum clock deviation accumulated value, it indicates that the precision of clock synchronization performed by using the second master clock node is higher than that of clock synchronization performed by using the first master clock node. In this case, the network device can determines the second master clock node as the master clock node for clock synchronization, so that precision of clock synchronization performed by the network device can be higher.

It should be noted that under a condition that the identifier of the first clock source node is the same as the identifier of the second clock source node, when the first maximum clock deviation accumulated value is equal to the second maximum deviation accumulated value, the announce message from the first master clock node may carry the hop count from the first master clock node to the first clock source node, and the announce message from the second master clock node may carry the hop count from the second master clock node to the second clock source node. By comparing the hop count from the first master clock node to the first clock source node and the hop count from the second master clock node to the second clock source node, a master clock node that is used by the network device to perform clock synchronization may be selected. Because a larger hop count indicates a larger quantity of clock nodes on a path from the master clock node to the clock source node, and a larger quantity of clock nodes bring a larger clock deviation, the precision of clock synchronization performed by using the master clock node is reduced. Therefore, when the hop count from the first master clock node to the first clock source node is less than the hop count from the second master clock node to the second clock source node, it indicates that the precision of clock synchronization performed by using the first master clock node is higher than that of clock synchronization performed by using the second master clock node. In this case, the network device may determine the first master clock node as the master clock node for clock synchronization. Certainly, when the hop count from the first master clock node to the first clock source node is greater than the hop count from the second master clock node to the second clock source node, it indicates that the precision of clock synchronization performed by using the second master clock node is higher than that of clock synchronization performed by using the first master clock node. In this case, the network device may determine the second master clock node as the master clock node for clock synchronization.

In a second possible implementation, the network device determines a third maximum clock deviation accumulated value and a fourth maximum clock deviation accumulated value, and compares the third maximum clock deviation accumulated value with the fourth maximum clock deviation accumulated value. When the third maximum clock deviation accumulated value is less than the fourth maximum clock deviation accumulated value, the network device determines a first master clock node as a master clock node for clock synchronization. When the third maximum clock deviation accumulated value is greater than the fourth maximum clock deviation accumulated value, the network device determines the second master clock node as the master clock node for clock synchronization.

It should be noted that the third maximum clock deviation accumulated value is a sum of a maximum clock deviation corresponding to a transmission medium between the first master clock node and the network device and the first maximum clock deviation accumulated value, and the fourth maximum clock deviation accumulated value is a sum of a maximum clock deviation corresponding to a transmission medium between the second master clock node and the network device and the second maximum clock deviation accumulated value.

Based on the foregoing description of S301, the maximum clock deviation of the transmission medium between two adjacent clock nodes may be saved in any one of the two clock nodes. In other words, the maximum clock deviation corresponding to the transmission medium between the first master clock node and the network device may be saved in the first master clock node, or may be saved in the network device. Likewise, the maximum clock deviation corresponding to the transmission medium between the second master clock node and the network device may be saved in the second master clock node, or may be saved in the network device. When the maximum clock deviation corresponding to the transmission medium between the first master clock node and the network device is saved in the first master clock node, and the maximum clock deviation corresponding to the transmission medium between the second master clock node and the network device is saved in the second master clock node, the first clock deviation accumulated value carried in the announce message from the first master clock node includes the maximum clock deviation corresponding to the transmission medium between the first master clock node and the network device, and the second clock deviation accumulated value carried in the announce message from the second master clock node includes the maximum clock deviation corresponding to the transmission medium between the second master clock node and the network device. In this case, it is possible to directly compare the first maximum clock deviation accumulated value with the second maximum clock deviation accumulated value. When the first maximum clock deviation accumulated value is less than the second maximum clock deviation accumulated value, the network device determines the first master clock node as the master clock node for clock synchronization. When the first maximum clock deviation accumulated value is greater than the second maximum clock deviation accumulated value, the network device determines the second master clock node as the master clock node for clock synchronization.

However, when the maximum clock deviation corresponding to the transmission medium between the first master clock node and the network device is saved in the network device, and the maximum clock deviation corresponding to the transmission medium between the second master clock node and the network device is saved in the network device, the first clock deviation accumulated value carried in the announce message from the first master clock node does not include the maximum clock deviation corresponding to the transmission medium between the first master clock node and the network device, and the second clock deviation accumulated value carried in the announce message from the second master clock node does not include the maximum clock deviation corresponding to the transmission medium between the second master clock node and the network device. In this case, it is necessary to determine a third maximum clock deviation accumulated value and a fourth maximum clock deviation accumulated value, and compare the third maximum clock deviation accumulated value with the fourth maximum clock deviation accumulated value. When the third maximum clock deviation accumulated value is less than the fourth maximum clock deviation accumulated value, the network device determines a first master clock node as a master clock node for clock synchronization. When the third maximum clock deviation accumulated value is greater than the fourth maximum clock deviation accumulated value, the network device determines the second master clock node as the master clock node for clock synchronization.

In addition, when the third maximum clock deviation accumulated value is less than the fourth maximum clock deviation accumulated value, it indicates that the precision of clock synchronization performed by using the first master clock node is higher than that of clock synchronization performed by using the second master clock node. In this case, the network device determines the first master clock node as the master clock node for clock synchronization, so that precision of clock synchronization performed by the network device can be higher. When the third maximum clock deviation accumulated value is greater than the fourth maximum clock deviation accumulated value, it indicates that the precision of clock synchronization performed by using the second master clock node is higher than that of clock synchronization performed by using the first master clock node. In this case, the network device determines the second master clock node as the master clock node for clock synchronization, so that precision of clock synchronization performed by the network device can be higher.

The third maximum clock deviation accumulated value is described herein below by way of example.

For example, taking the network device 111 in FIG. 1 as an example, the network device 105 is the first master clock node. In this case, the network device 103 is the first clock source node. A path from the network device 103 to the network device 105 includes the network device 104. The network device 104 corresponds to the maximum clock deviation 104, the network device 105 corresponds to the maximum clock deviation 105, the transmission medium n between the network device 104 and the network device 105 corresponds to the maximum clock deviation n, and the transmission medium m between the network device 105 and the network device 111 corresponds to the maximum clock deviation m, that is, there are four first maximum clock deviations on a path from the network device 103 to the network device 105, that is, a maximum clock deviation 104, a maximum clock deviation 105, a maximum clock deviation n, and a maximum clock deviation m. In this way, the first maximum clock deviation accumulated value is a sum of the maximum clock deviation 104, the first maximum clock deviation 105, and the first maximum clock deviation n, and the third maximum clock deviation accumulated value is a sum of the maximum clock deviation m and the first maximum clock deviation accumulated value.

It should be noted that under a condition that the identifier of the first clock source node is the same as the identifier of the second clock source node, when the third maximum clock deviation accumulated value is equal to the fourth maximum deviation accumulated value, the announce message from the first master clock node may carry the hop count from the first master clock node to the first clock source node, and the announce message from the second master clock node may carry the hop count from the second master clock node to the second clock source node. By comparing the hop count from the first master clock node to the first clock source node and the hop count from the second master clock node to the second clock source node, a master clock node that is used by the network device to perform clock synchronization may be selected. Because a larger hop count indicates a larger quantity of clock nodes on a path from the master clock node to the clock source node, and a larger quantity of clock nodes bring a larger clock deviation, the precision of clock synchronization performed by using the master clock node is reduced. Therefore, when the hop count from the first master clock node to the first clock source node is less than the hop count from the second master clock node to the second clock source node, it indicates that the precision of clock synchronization performed by using the first master clock node is higher than that of clock synchronization performed by using the second master clock node. In this case, the network device may determine the first master clock node as the master clock node for clock synchronization. Certainly, when the hop count from the first master clock node to the first clock source node is greater than the hop count from the second master clock node to the second clock source node, it indicates that the precision of clock synchronization performed by using the second master clock node is higher than that of clock synchronization performed by using the first master clock node. In this case, the network device may determine the second master clock node as the master clock node for clock synchronization.

S304: The network device calibrates a clock of the network device based on time information of the selected master clock node.

It should be noted that calibrating the clock of the network device is setting a parameter of the clock of the network device to be the same as that of the clock of the selected master clock node. The parameter of the clock may be a time of the clock, a frequency of the clock, or a time and a frequency of the clock.

An embodiment of S304 may include: performing, by the network device, communication with the master clock node according to the IEEE1588-2008 by using PTP messages. PTP messages include Sync, Delay_req, and Delay_resp messages. The time information is carried in PTP messages. The time information may be a timestamp 1, a timestamp 2, a timestamp 3, and a timestamp 4. The network device may calculate the time deviation between the network device and the master clock node by using the time information. The network device calibrates the time of the clock of the network device based on the time deviation. In some embodiments, the network device may calculate the frequency deviation between the network device and the master clock node by using the time information. The network device calibrates the frequency of clock of the network device based on the frequency deviation. The network device may calibrate only the time. The network device may calibrate only the frequency. The network device may calibrate both the time and the frequency. For a process in which the network device communicates with the master clock node by using the PTP messages, refer to the foregoing description of communication between the network device 104 and the network device 103 through the PTP messages. For a process in which the network device obtains the time information, refer to the foregoing description of obtaining the timestamp 1, the timestamp 2, the timestamp 3, and the timestamp 4 by the network device 104.

In some embodiments, in which the network device calibrates the frequency of the clock of the network device based on the frequency deviation may include that the clock of the network device may include a voltage source and a crystal oscillator. The output voltage of the voltage source acts on the crystal oscillator. A higher output voltage of the voltage source indicates a higher working frequency of the crystal oscillator. The network device may include a central processing unit. The central processing unit may control an output voltage of the voltage source. Further, the central processing unit may calibrate the frequency of the clock of the network device by controlling the output voltage of the voltage source. In some embodiments, the central processing unit may determine the voltage adjustment value 1 according to the frequency deviation. In some embodiments, the network device includes a memory coupled to the central processing unit. The memory may store a correspondence between a frequency deviation and a voltage adjustment value. The central processing unit may search, by accessing the memory, the correspondence for a voltage adjustment value corresponding to the first frequency deviation, that is, the voltage adjustment value 1. Before the central processing unit determines the voltage adjustment value 1, the output voltage of the voltage source is the voltage value 1. After the central processing unit determines the voltage adjustment value 1, it is possible to adjust the output voltage of the voltage source to the voltage value 2 based on the voltage adjustment value 1. The voltage value 2 is equal to a sum of the voltage value 1 and the voltage adjustment value 1. Therefore, if the voltage adjustment value 1 is a positive number, it means that the frequency of the clock of the network device is lower than the frequency of the master clock node. The central processing unit may calibrate the frequency of the clock of the network device by increasing the operating frequency of the crystal oscillator. If the voltage adjustment value 1 is a negative number, it means that the frequency of the clock of the network device is higher than the frequency of the master clock node. The central processing unit may calibrate the frequency of the clock of the network device by reducing the operating frequency of the crystal oscillator.

In some embodiments, in which the network device calibrates the time of the clock of the network device based on the time deviation may include that the clock of the network device includes a crystal oscillator and a counter. The counter may be specifically an accumulator. The counter may include one memory. The value saved in the memory is equal to the current time recorded by the clock. The crystal oscillator can output a pulse signal to the counter in each working period. When the counter detects the rising edge or the falling edge of the pulse signal, the counter performs an addition operation on the increment and the value saved in the memory, to update the value saved in the memory. The increment is equal to the nominal working period of the crystal oscillator. For example, the nominal working frequency of the crystal oscillator may be 125 mega hertz (MHz). Correspondingly, the nominal working period of the crystal oscillator may be 8 nanoseconds. After the central processing unit of the network device determines the time deviation, the central processing unit may update, based on the time deviation, the value saved in the memory included in the counter, to update the time of the clock of the network device. Through the foregoing processes, the time of the clock of the network device may be calibrated.

Figure 4A:
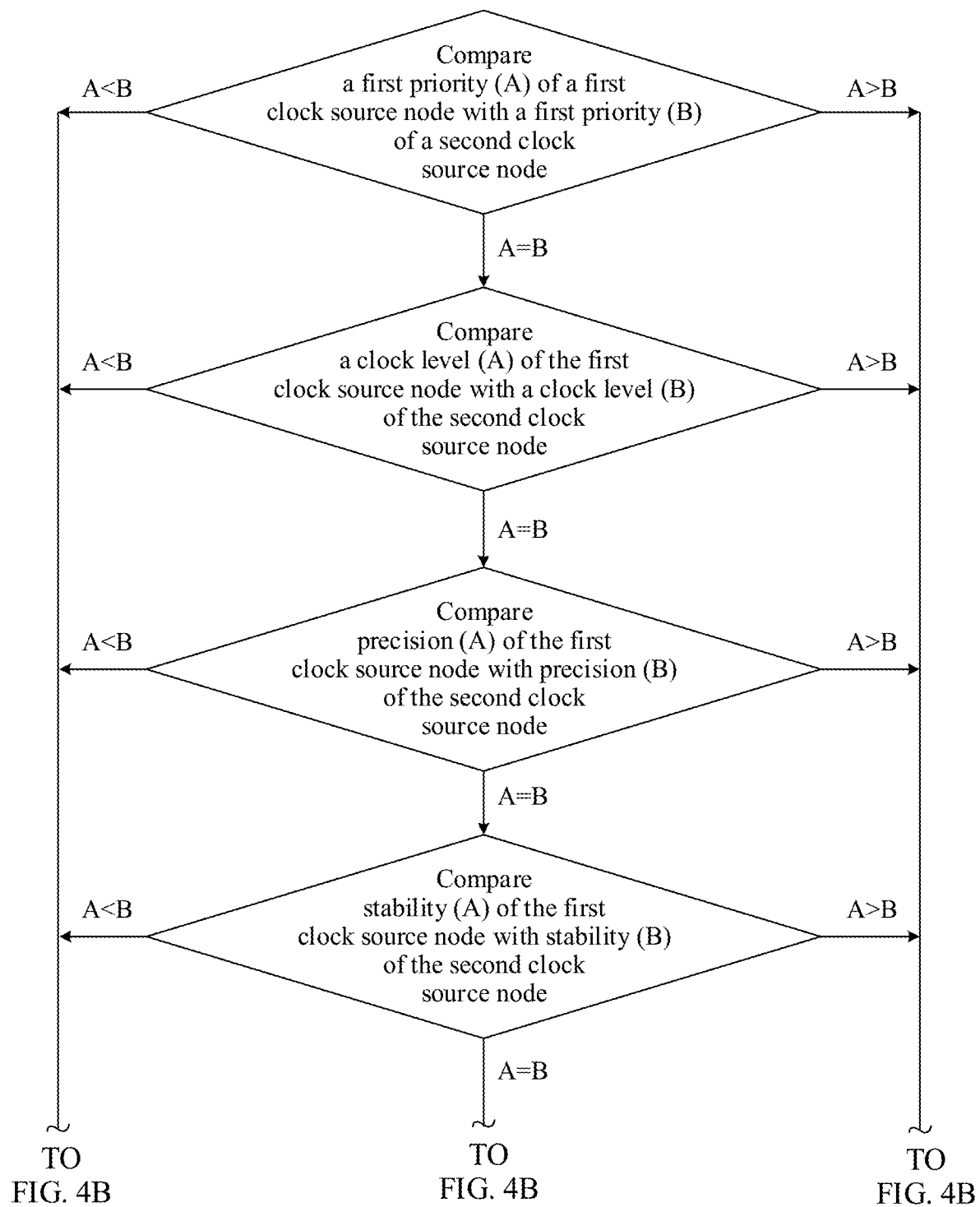
FIG. 4A and FIG. 4B are a first flowchart of selecting a master clock node according to an embodiment of this application.
Figure 4B:
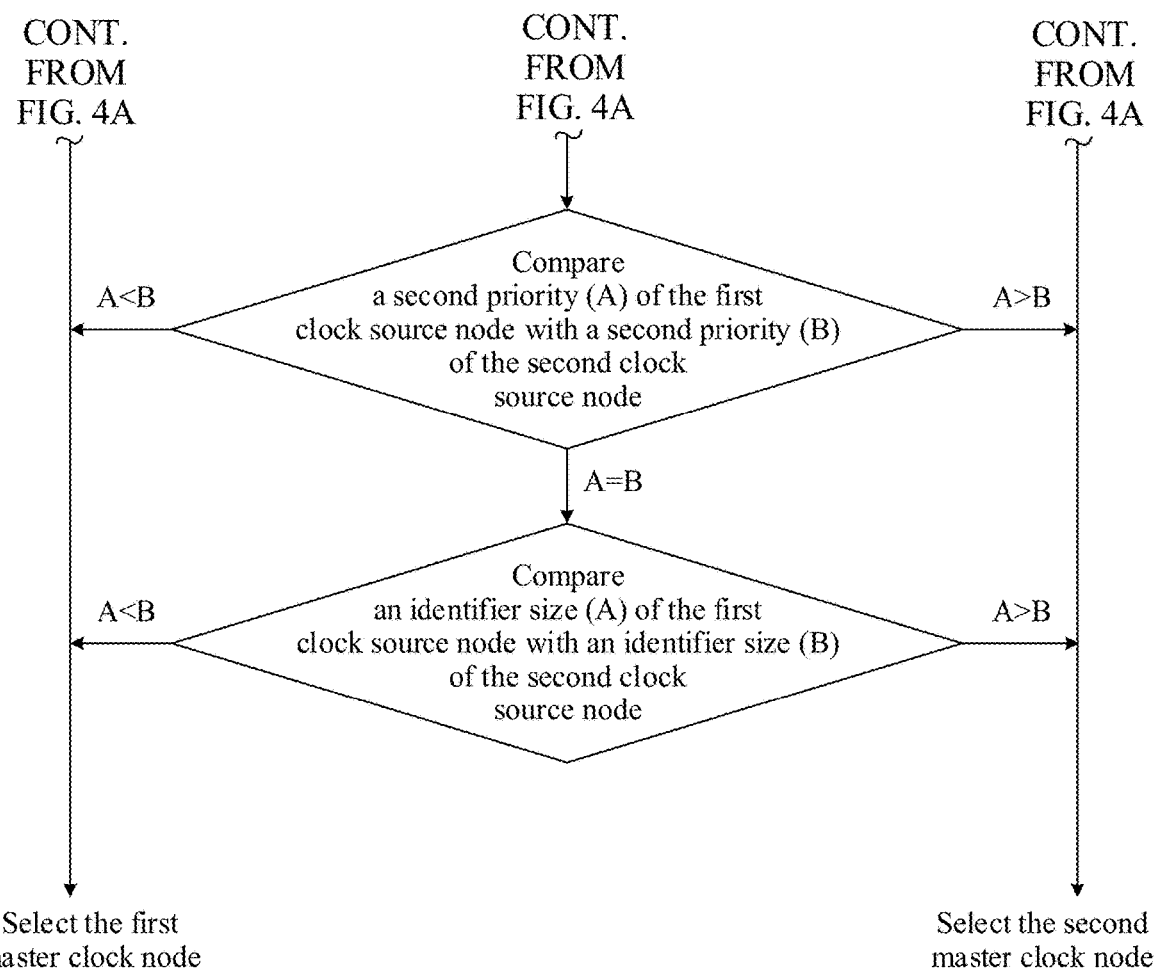

It should be noted that in the foregoing technical solution, clock synchronization is performed when the identifier of the first clock source node is the same as the identifier of the second clock source node. However, when the identifier of the first clock source node is different from the identifier of the second clock source node, it is necessary to select, in another manner, the master clock node for clock synchronization. This case is described herein below. In some embodiments, the announce message from the first master clock node carries a first priority of the first clock source node, a clock level of the first clock source node, precision of the first clock source node, stability of the first clock source node, and a second priority of the first clock source node. The announce message from the second master clock node carries a first priority of the second clock source node, a clock level of the second clock source node, precision of the second clock source node, stability of the second clock source node, and a second priority of the second clock source node. In this case, referring to FIG. 4A and FIG. 4B, when the identifier of the first clock source node is the same as the identifier of the second clock source node, the network device may sequentially compare the above items, that is, sequentially compare the first priority of the first clock source node with the first priority of the second clock source node, compare the clock level of the first clock source node with the clock level of the second clock source node, compare the precision of the first clock source node with the precision of the second clock source node, compare the stability of the first clock source node with the stability of the second clock source node, compare the second priority of the first clock source node with the second priority of the second clock source node, and compare the identifier size of the first clock source node with the identifier size of the second clock source node. When content of a compared item is different, the clock source node corresponding to the smaller one may be selected, and clock synchronization is performed according to the master clock node corresponding to the selected clock source node.

In this embodiment of this application, the network device first receives the announce message from the first master clock node and the announce message from the second master clock node, where the announce message from the first master clock node carries the identifier of the first clock source node and the first maximum clock deviation accumulated value, the announce message from the second master clock node carries the identifier of the second clock source node and the second maximum clock deviation accumulated value. Then, the network device compares the identifier of the first clock source node with the identifier of the second clock source node. When the identifier of the first clock source node is the same as the identifier of the second clock source node, it indicates that the first master clock node and the second master clock node correspond to a same clock source node. In this case, the first maximum clock deviation accumulated value and the second maximum clock deviation accumulated value help select, from the first master clock node and the second master clock node, a master clock node with a relatively small clock deviation brought by a path from the clock source node to the master clock node. Then, the clock of the network device is calibrated based on the time information of the selected master clock node. If the clock deviation brought by the path from the clock source node to the master clock node is relatively small, the precision of clock synchronization performed by using the master clock node is higher, so that precision of a clock calibrated by the network device is higher.

Figure 5:
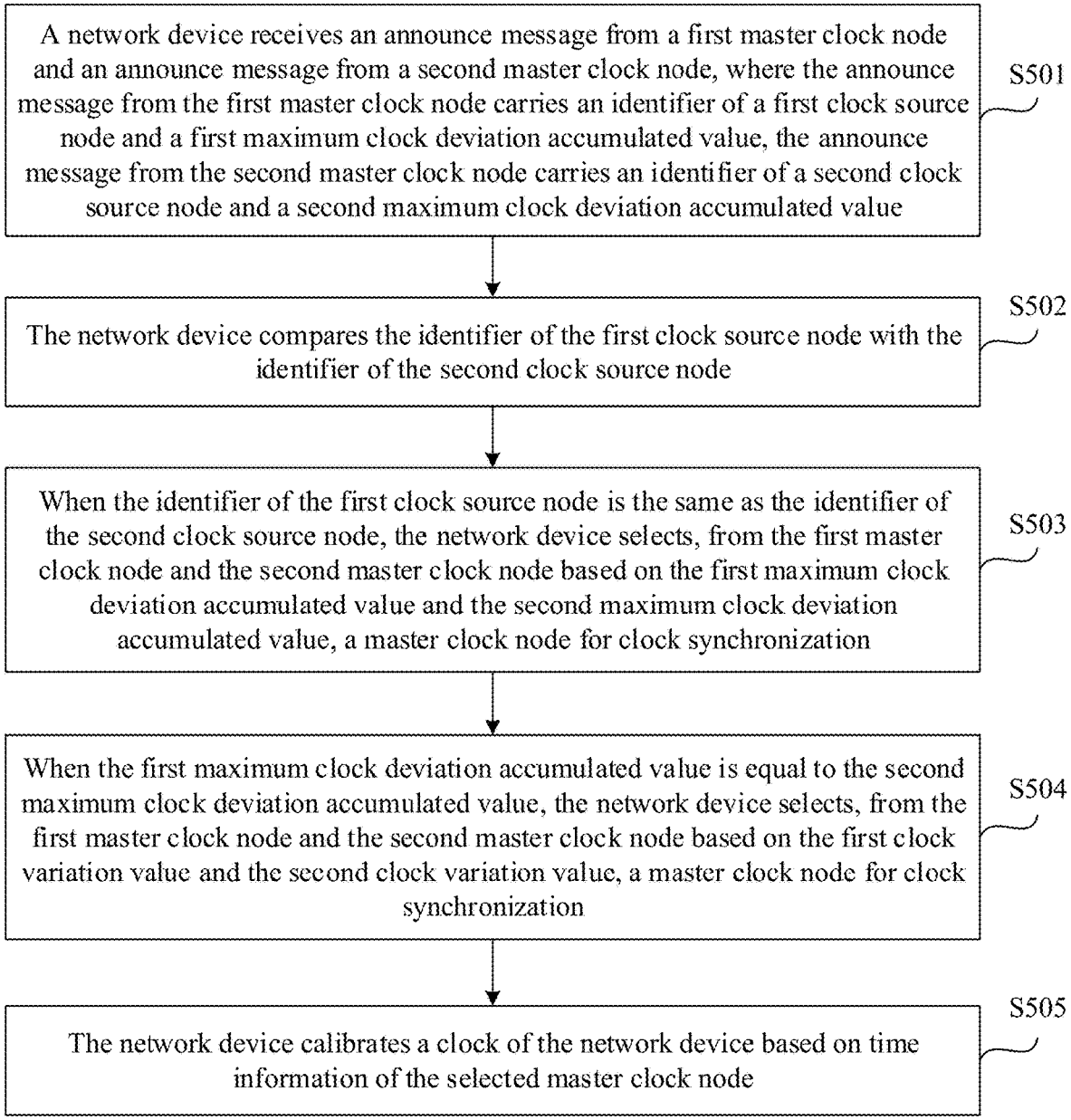
FIG. 5 is a flowchart of a second clock synchronization method according to an embodiment of this application.

FIG. 5 is a flowchart of a second clock synchronization method according to an embodiment of this application. The method is applied to a network device. Referring to FIG. 5, the method includes S501 to S505.

S501: A network device receives an announce message from a first master clock node and an announce message from a second master clock node, where the announce message from the first master clock node carries an identifier of a first clock source node and a first maximum clock deviation accumulated value, the announce message from the second master clock node carries an identifier of a second clock source node and a second maximum clock deviation accumulated value.

S502: The network device compares the identifier of the first clock source node with the identifier of the second clock source node.

S503: When the identifier of the first clock source node is the same as the identifier of the second clock source node, the network device selects, from the first master clock node and the second master clock node based on the first maximum clock deviation accumulated value and the second maximum clock deviation accumulated value, a master clock node for clock synchronization.

It should be noted that content of S501 to S503 in this embodiment is similar to content of S301 to S303 in the foregoing embodiment. In some embodiments of S501 to S503, refer to the descriptions of S301 to S303 in the embodiments. Details are not described herein again. However, when the first maximum clock deviation accumulated value is equal to the second maximum clock deviation accumulated value, and when the third maximum clock deviation accumulated value is equal to the fourth maximum clock deviation accumulated value, in this embodiment, a manner in which the network device selects the master clock node for clock synchronization is different from the manner in the foregoing embodiment, this case is described in detail herein below.

S504: When the first maximum clock deviation accumulated value is equal to the second maximum clock deviation accumulated value, the network device selects, from the first master clock node and the second master clock node based on the first clock variance value and the second clock variance value, a master clock node for clock synchronization.

It should be noted that the announce message from the first master clock node may carry the first clock variance value, and the announce message from the second master clock node may carry the second clock variance value. The first clock variance value is a square root of a sum of squares of a plurality of first clock deviation variance values, and the second clock variance value is a square root of a sum of squares of a plurality of second clock deviation variance values.

In some embodiments (sometimes referred to as, a first case), on the path from the clock source node to the master clock node, a clock deviation may exist only in the clock node. Therefore, for any one of the plurality of first clock deviation variance values, the first clock deviation variance value may be a variance value of a plurality of clock deviations corresponding to one clock node on a path from the first clock source node to the first master clock node. Likewise, for any one of the plurality of second clock deviation variance values, the second clock deviation variance value may be a variance value of a plurality of clock deviations corresponding to one clock node on a path from the second clock source node to the second master clock node. That is, each clock node on the path from the first clock source node to the first master clock node corresponds to a plurality of clock deviations, and a variance value of the plurality of clock deviations is the first clock deviation variance value, and each clock node on the path from the second clock source node to the second master clock node corresponds to a plurality of clock deviations, and a variance value of the plurality of clock deviations is the second clock deviation variance value. In other words, the plurality of first clock deviation variance values are in a one-to-one correspondence with the plurality of clock nodes on the path from the first clock source node to the first master clock node, and the plurality of second clock deviation variance values are in a one-to-one correspondence with the plurality of clock nodes on the path from the second clock source node to the second master clock node.

Because the clock deviation is described in the foregoing embodiment, the clock deviation may be a jump amplitude deviation, a jitter deviation, and a static deviation of a clock node. In addition, the maximum clock deviation of the clock node is described in the foregoing embodiment, that is, the maximum clock deviation of the clock node may be a sum of a maximum jump amplitude deviation, a maximum jitter deviation, and a maximum static deviation, or may be a sum of a maximum jitter deviation and a maximum static deviation. Therefore, similarly, the first clock deviation variance value of the clock node may be a variance value of a jump amplitude deviation, a jitter deviation, and a static deviation of the clock node, or may be a variance value of a jitter deviation and a static deviation of the clock node.

The first clock variance value in the first case is described herein below by way of example.

For example, taking the network device 111 in FIG. 1 as an example, the network device 105 is the first master clock node. In this case, the network device 103 is the first clock source node. A path from the network device 103 to the network device 105 includes the network device 104. The network device 104 corresponds to the first clock deviation variance value 104, and the network device 105 corresponds to the first clock deviation variance value 105. In this way, the first clock variance value is a square root of a sum of squares of the first clock deviation variance value 104 and the first clock deviation variance value 105.

In some embodiments (sometimes referred to as, a second case), on a path from the clock source node to the master clock node, in addition to a clock deviation existing in a clock node, a clock deviation may exist in a transmission medium between adjacent clock nodes. Therefore, the plurality of first clock deviation variance values include a variance value of a plurality of clock deviations corresponding to each clock node on the path from the first clock source node to the first master clock node, and a variance value of a plurality of clock deviations corresponding to a transmission medium between each pair of adjacent clock nodes in at least one pair of adjacent clock nodes in the plurality of clock nodes on the path from the first clock source node to the first master clock node. The plurality of second clock deviation variance values include a variance value of a plurality of clock deviations corresponding to each clock node on the path from the second clock source node to the second master clock node, and a variance value of a plurality of clock deviations corresponding to a transmission medium between each pair of adjacent clock nodes in at least one pair of adjacent clock nodes in the plurality of clock nodes on the path from the second clock source node to the second master clock node. That is, each clock node on the path from the first clock source node to the first master clock node corresponds to one clock deviation variance value, and a transmission medium between each pair of adjacent clock nodes in the at least one pair of adjacent clock nodes corresponds to one clock deviation variance value, which may be referred to as a first clock deviation variance value. Similarly, each clock node on the path from the second clock source node to the second master clock node corresponds to one clock deviation variance value, and a transmission medium between each pair of adjacent clock nodes in the at least one pair of adjacent clock nodes corresponds to one clock deviation variance value, which may be referred to as a second clock deviation variance value.

The first clock variance value in the second case is described herein below by way of example.

For example, taking the network device 111 in FIG. 1 as an example, the network device 105 is the first master clock node. In this case, the network device 103 is the first clock source node. A path from the network device 103 to the network device 105 includes the network device 104. The network device 104 corresponds to the first clock deviation variance value 104, the network device 105 corresponds to the first clock deviation variance value 105, and the transmission medium n between the network device 104 and the network device 105 corresponds to the first clock deviation variance value n. In this way, the first clock variance value is a square root of a sum of squares of the first clock deviation variance value 104, the first clock deviation variance value 105, and the first clock deviation variance value n.

In the two different cases, concepts of the first clock variance value and the second clock variance value are different. Therefore, according to the first clock variance value and the second clock variance value, an embodiment of selecting, from the first master clock node and the second master clock node, the master clock node for clock synchronization is different. The selections of the master clock node are described separately in two possible implementations. The first possible implementation corresponds to the first case in S504, and the second possible implementation corresponds to the second case in S504.

In a first possible implementation: the network device compares the first clock variance value with the second clock variance value. When the first clock variance value is less than the second clock variance value, the network device determines the first master clock node as the master clock node for clock synchronization. When the first clock variance value is greater than the second clock variance value, the network device determines the second master clock node as the master clock node for clock synchronization.

It should be noted that when the first clock variance value is less than the second clock variance value, it indicates that the precision of clock synchronization performed by using the first master clock node is higher than that of clock synchronization performed by using the second master clock node. In this case, the network device determines the first master clock node as the master clock node for clock synchronization, so that precision of clock synchronization performed by the network device can be higher. Similarly, when the first clock variance value is greater than the second clock variance value, it indicates that the precision of clock synchronization performed by using the second master clock node is higher than that of clock synchronization performed by using the first master clock node. In this case, the network device can determine the second master clock node as the master clock node for clock synchronization, so that precision of clock synchronization performed by the network device can be higher.

It should be noted that under a condition that the identifier of the first clock source node is the same as the identifier of the second clock source node, when the first maximum clock deviation accumulated value is equal to the second maximum deviation accumulated value, and the first clock variance value is equal to the second clock variance value, the announce message from the first master clock node may carry the hop count from the first master clock node to the first clock source node, and the announce message from the second master clock node may carry the hop count from the second master clock node to the second clock source node. By comparing the hop count from the first master clock node to the first clock source node and the hop count from the second master clock node to the second clock source node, a master clock node that is used by the network device to perform clock synchronization may be selected. Because a larger hop count indicates a larger quantity of clock nodes on a path from the master clock node to the clock source node, and a larger quantity of clock nodes bring a larger clock deviation, the precision of clock synchronization performed by using the master clock node is reduced. Therefore, when the hop count from the first master clock node to the first clock source node is less than the hop count from the second master clock node to the second clock source node, it indicates that the precision of clock synchronization performed by using the first master clock node is higher than that of clock synchronization performed by using the second master clock node. In this case, the network device may determine the first master clock node as the master clock node for clock synchronization. Certainly, when the hop count from the first master clock node to the first clock source node is greater than the hop count from the second master clock node to the second clock source node, it indicates that the precision of clock synchronization performed by using the second master clock node is higher than that of clock synchronization performed by using the first master clock node. In this case, the network device may determine the second master clock node as the master clock node for clock synchronization.

In a second possible implementation: the network device determines a third clock variance value and a fourth clock variance value, and the network device compares the third clock variance value with the fourth clock variance value. When the third clock variance value is less than the fourth clock variance value, the network device determines a first master clock node as a master clock node for clock synchronization. When the third clock variance value is greater than the fourth clock variance value, the network device determines the second master clock node as the master clock node for clock synchronization.

It should be noted that the third clock variance value is a square root of a sum of squares of a variance value of a plurality of clock deviations corresponding to the transmission medium between the first master clock node and the network device and the first clock variance value, and the fourth clock variance value is a square root of a sum of squares of a variance value of a plurality of clock deviations corresponding to the transmission medium between the second master clock node and the network device and the second clock variance value.

Similar to the above second possible implementation of S303, in a second possible implementation of S504, when a variance value of the plurality of clock deviations corresponding to the transmission medium between the first master clock node and the network device is saved in the first master clock node, and a variance value of the plurality of clock deviations corresponding to the transmission medium between the second master clock node and the network device is saved in the second master clock node, the first clock deviation variance value carried in the announce message from the first master clock node is a result obtained by considering the variance value of the plurality of clock deviations corresponding to the transmission medium between the first master clock node and the network device, and the second clock deviation variance value carried in the announce message from the second master clock node is a result obtained by considering the variance value of the plurality of clock deviations corresponding to the transmission medium between the second master clock node and the network device. In this case, the first clock deviation variance value may be directly compared with the second clock deviation variance value. When the first clock deviation variance value is less than the second clock deviation variance value, the network device determines the first master clock node as the master clock node for clock synchronization. When the first clock deviation variance value is greater than the second clock deviation variance value, the network device determines the second master clock node as the master clock node for clock synchronization.

However, when a variance value of the plurality of clock deviations corresponding to the transmission medium between the first master clock node and the network device is saved in the network device, and a variance value of the plurality of clock deviations corresponding to the transmission medium between the second master clock node and the network device is saved in the network device, the first clock deviation variance value carried in the announce message from the first master clock node does not consider the variance value of the plurality of clock deviations corresponding to the transmission medium between the first master clock node and the network device, and the second clock deviation variance value carried in the announce message from the second master clock node does not consider the variance value of the plurality of clock deviations corresponding to the transmission medium between the second master clock node and the network device. In this case, it is necessary to determine a third clock deviation variance value and a fourth clock deviation variance value, and compare the third clock variance value with the fourth clock variance value. When the third clock variance value is less than the fourth clock variance value, the network device determines a first master clock node as a master clock node for clock synchronization. When the third clock variance value is greater than the fourth clock variance value, the network device determines the second master clock node as the master clock node for clock synchronization.

In addition, when the third clock variance value is less than the fourth clock variance value, it indicates that the precision of clock synchronization performed by using the first master clock node is higher than that of clock synchronization performed by using the second master clock node. In this case, the network device determines the first master clock node as the master clock node for clock synchronization, so that precision of clock synchronization performed by the network device can be higher. Similarly, when the third clock variance value is greater than the fourth clock variance value, it indicates that the precision of clock synchronization performed by using the second master clock node is higher than that of clock synchronization performed by using the first master clock node. In this case, the network device determines the second master clock node as the master clock node for clock synchronization, so that precision of clock synchronization performed by the network device can be higher.

The third clock variance value is described herein below by way of example.

For example, taking the network device 111 in FIG. 1 as an example, the network device 105 is the first master clock node. In this case, the network device 103 is the first clock source node. A path from the network device 103 to the network device 105 includes the network device 104. The network device 104 corresponds to the first clock deviation variance value 104, the network device 105 corresponds to the first clock deviation variance value 105, and the transmission medium n between the network device 104 and the network device 105 corresponds to the first clock deviation variance value n, a transmission medium m between the network device 105 and the network device 111 corresponds to a first clock deviation variance value m. In this way, the first clock variance value is a square root of a sum of squares of the first clock deviation variance value 104, the first clock deviation variance value 105, and the first clock deviation variance value n. Therefore, the third clock variance value is a square root of a sum of squares of the first clock deviation variance value m and the first clock variance value.

It should be noted that under a condition that the identifier of the first clock source node is the same as the identifier of the second clock source node, when the first maximum clock deviation accumulated value is equal to the second maximum deviation accumulated value, and the third clock variance value is equal to the fourth clock variance value, the announce message from the first master clock node may carry the hop count from the first master clock node to the first clock source node, and the announce message from the second master clock node may carry the hop count from the second master clock node to the second clock source node. By comparing the hop count from the first master clock node to the first clock source node and the hop count from the second master clock node to the second clock source node, a master clock node that is used by the network device to perform clock synchronization may be selected. Because a larger hop count indicates a larger quantity of clock nodes on a path from the master clock node to the clock source node, and a larger quantity of clock nodes bring a larger clock deviation, the precision of clock synchronization performed by using the master clock node is reduced. Therefore, when the hop count from the first master clock node to the first clock source node is less than the hop count from the second master clock node to the second clock source node, it indicates that the precision of clock synchronization performed by using the first master clock node is higher than that of clock synchronization performed by using the second master clock node. In this case, the network device may determine the first master clock node as the master clock node for clock synchronization. Certainly, when the hop count from the first master clock node to the first clock source node is greater than the hop count from the second master clock node to the second clock source node, it indicates that the precision of clock synchronization performed by using the second master clock node is higher than that of clock synchronization performed by using the first master clock node. In this case, the network device may determine the second master clock node as the master clock node for clock synchronization.

S505: The network device calibrates a clock of the network device based on time information of the selected master clock node.

It should be noted that for a embodiment of S505, reference may be made to the description of S304 in the embodiments. Details are not described herein again.

It should be noted that in the foregoing technical solution, clock synchronization is performed when the identifier of the first clock source node is the same as the identifier of the second clock source node. However, when the identifier of the first clock source node is different from the identifier of the second clock source node, it is necessary to select, in another manner, the master clock node for clock synchronization. This case is described herein below by the following operation (1) to operation (3). The announce message from the first master clock node may carry the first priority and the first maximum clock source deviation of the first clock source node, and the announce message from the second master clock node may carry the first priority and the second maximum clock source deviation of the second clock source node. Under such a condition, after S502, the following operation (1) to operation (3) may be included:

Operation (1): When the identifier of the first clock source node is different from the identifier of the second clock source node, the network device compares the first priority of the first clock source node with the first priority of the second clock source node.

It should be noted that the first priority is used to indicate a priority level of a clock source node, and a smaller value of the first priority indicates a higher priority level of a clock source node corresponding to the first priority value. A value range of the first priority may be preset based on a user requirement. This is not specifically limited in an embodiment of this application. For example, the value range of the first priority may be 0 to 255.

Operation (2): When the first priority of the first clock source node is equal to the first priority of the second clock source node, the network device compares the first maximum clock source deviation with the second maximum clock source deviation, and when the first maximum clock source deviation is less than the second maximum clock source deviation, the network device determines the first master clock node as a master clock node for clock synchronization; when the first maximum clock source deviation is greater than the second maximum clock source deviation, the network device determines the second master clock node as the master clock node for clock synchronization.

It should be noted that when the first priority of the first clock source node is equal to the first priority of the second clock source node, it indicates that the priority level of the first clock source node is the same as the priority level of the second clock source node. The first maximum clock source deviation may be a maximum clock deviation corresponding to the first clock source node, and the second maximum clock source deviation may be a maximum clock deviation corresponding to the second clock source node.

In addition, when the first maximum clock source deviation is less than the second maximum clock source deviation, it indicates that the precision of the first clock source node is higher than that of the second clock source node. In this case, the network device determines that the first master clock node that is on the same path as the first clock source node is the master clock node for clock synchronization, so that precision of clock synchronization performed by the network device can be higher. When the first maximum clock source deviation is greater than the second maximum clock source deviation, it indicates that the precision of the second clock source node is higher than that of the first clock source node. In this case, the network device determines that the second master clock node that is on the same path as the second clock source node is the master clock node for clock synchronization, so that precision of clock synchronization performed by the network device can be higher.

Operation (3): The network device calibrates a clock of the network device based on time information of the first master clock node.

It should be noted that operation (3) is similar to S304, and details are not described herein again.

In some embodiments, after the network device compares the first maximum clock source deviation with the second maximum clock source deviation, and when the first maximum clock source deviation is equal to the second maximum clock source deviation, the announce message from the first master clock node may carry the first clock source variance value, the announce message from the second master clock node may carry the second clock source variance value. Under such a condition, the method may include the following operation A to operation B.

Operation A: When the first maximum clock source deviation is equal to the second maximum clock source deviation, the network device compares the first clock source variance value with the second clock source variance value, and when the first clock source variance value is less than the second clock source variance value, the network device determines a first master clock node as a master clock node for clock synchronization, and when the first clock source variance value is greater than the second clock source variance value, the network device determines the second master clock node as the master clock node for clock synchronization.

It should be noted that the first clock source variance value is a variance value of a plurality of clock deviations corresponding to the first clock source node, and the second clock source variance value is a variance value of a plurality of clock deviations corresponding to the second clock source node. When the first clock source variance value is less than the second clock source variance value, it indicates that the precision of the first clock source node is higher than that of the second clock source node. In this case, the network device determines that the first master clock node that is on the same path as the first clock source node is the master clock node for clock synchronization, so that precision of clock synchronization performed by the network device can be higher. When the first clock source variance value is greater than the second clock source variance value, it indicates that the precision of the second clock source node is higher than that of the first clock source node. In this case, the network device determines that the second master clock node that is on the same path as the second clock source node is the master clock node for clock synchronization, so that precision of clock synchronization performed by the network device can be higher.

Figure 6:
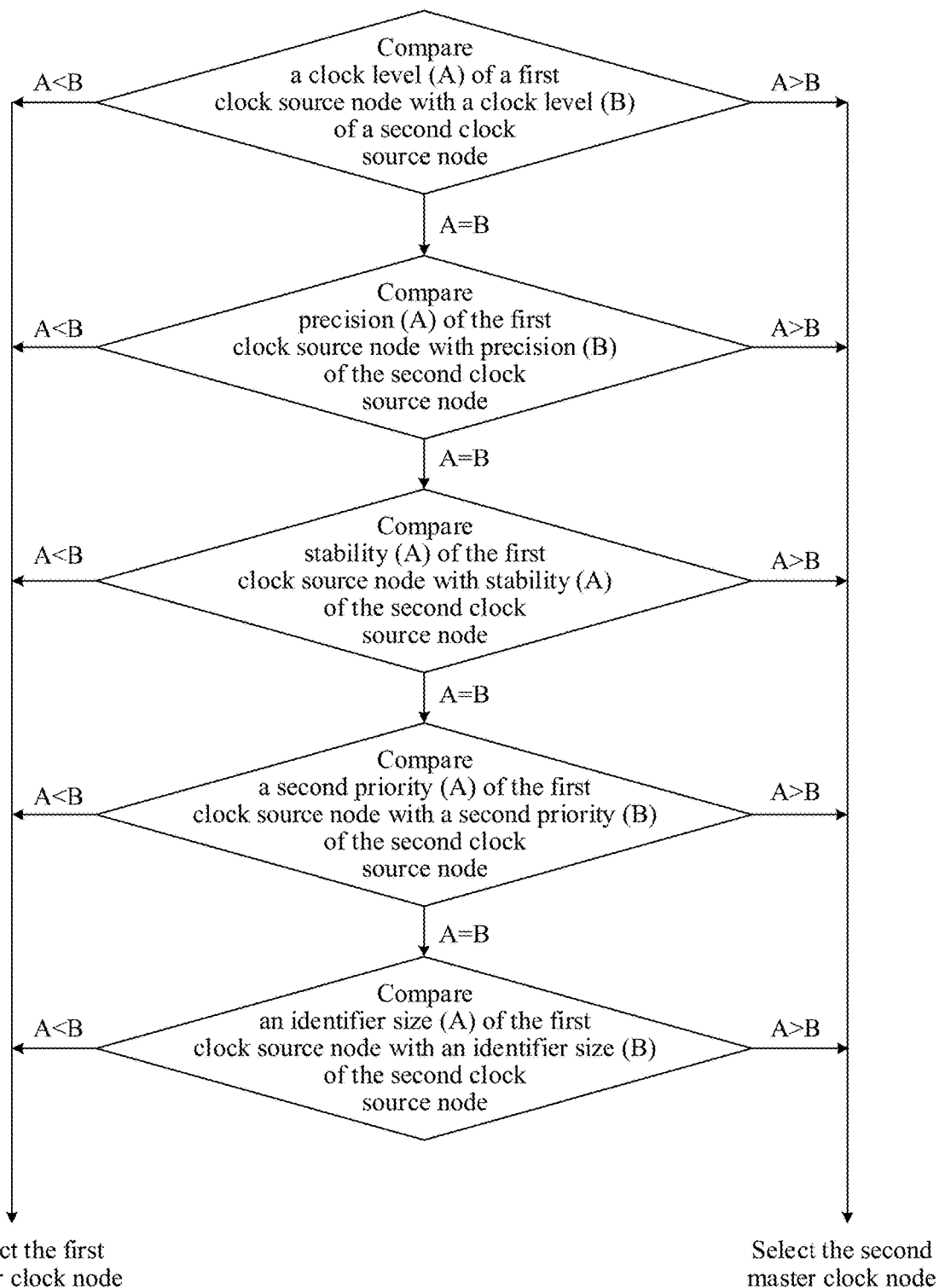
FIG. 6 is a second flowchart of selecting a master clock node according to an embodiment of this application.

It should be noted that under a condition that the identifier of the first clock source node is different from the identifier of the second clock source node, when the first clock source variance value is equal to the second clock source variance value, the announce message from the first master clock node may carry a clock level of the first clock source node, precision of the first clock source node, stability of the first clock source node, and a second priority of the first clock source node, and an announce message from the second master clock node may carry a clock level of the second clock source node, precision of the second clock source node, stability of the second clock source node, and a second priority of the second clock source node. In this case, referring to FIG. 6, when the identifier of the first clock source node is different from the identifier of the second clock source node, and the first clock source variance value is equal to the second clock source variance value, the network device may sequentially compare the foregoing items, that is, sequentially compare the clock level of the first clock source node with the clock level of the second clock source node, compare the precision of the first clock source node with the precision of the second clock source node, compare the stability of the first clock source node with the stability of the second clock source node, compare the second priority of the first clock source node with the second priority of the second clock source node, and compare the identifier size of the first clock source node with the identifier size of the second clock source node. When a difference occurs in a compared item, a clock source node corresponding to a smaller one may be selected, and clock synchronization is performed according to the master clock node corresponding to the selected clock source node.

Operation B: The network device calibrates a clock of the network device based on the time information of the selected master clock node.

It should be noted that operation B is similar to S304, and details are not described herein again.

In this embodiment of this application, the network device first receives the announce message from the first master clock node and the announce message from the second master clock node, where the announce message from the first master clock node carries the identifier of the first clock source node, the first maximum clock deviation accumulated value, and the first clock variance value, and the announce message from the second master clock node carries the identifier of the second clock source node, the second maximum clock deviation accumulated value, and the second clock variance value. Then, the network device compares the identifier of the first clock source node with the identifier of the second clock source node. When the identifier of the first clock source node is the same as the identifier of the second clock source node, it indicates that the first master clock node and the second master clock node correspond to a same clock source node. In this case, the network device selects, from the first master clock node and the second master clock node based on the first maximum clock deviation accumulated value and the second maximum clock deviation accumulated value, a master clock node for clock synchronization. When the first maximum clock deviation accumulated value is equal to the second maximum clock deviation accumulated value, the network device selects, from the first master clock node and the second master clock node based on the first clock variance value and the second clock variance value, the master clock node for clock synchronization. Finally, the network device calibrates the clock of the network device based on the time information of the selected master clock node. If clock deviation brought by a path from the clock source node to the master clock node is relatively small, the precision of clock synchronization performed by using the master clock node is higher, so that precision of a clock calibrated by the network device is higher.

Figure 7:
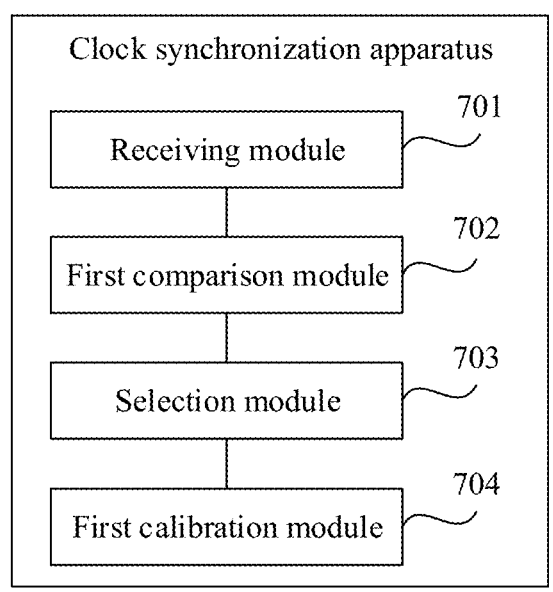
FIG. 7 is a schematic structural diagram of a clock synchronization apparatus according to an embodiment of this application.

FIG. 7 is a schematic structural diagram of a clock synchronization apparatus according to an embodiment of this application. The clock synchronization apparatus may be implemented as a part or all of a computer device by using software, hardware, or a combination thereof. The clock synchronization apparatus is applied to the network device, and the network device may be the network device shown in FIG. 2. Referring to FIG. 7, the apparatus includes a receiving module 701, a first comparison module 702, a selection module 703, and a first calibration module 704.

The receiving module 701 is configured to perform the operation in S301 or the operation in S501.

The first comparison module 702 is configured to perform the operation in S302 or the operation in S502.

The selection module 703 is configured to perform the operation in S303 or the operation in S503.

The first calibration module 704 is configured to perform the operation in S304.

In some embodiments, the plurality of first maximum clock deviations are a plurality of maximum clock deviations corresponding to a plurality of clock nodes on a path from the first clock source node to the first master clock node, and the plurality of second maximum clock deviations are a plurality of maximum clock deviations corresponding to a plurality of clock nodes on a path from the second clock source node to the second master clock node.

In some embodiments, the selection module 703 includes:
a first comparison submodule, configured to compare the first maximum clock deviation accumulated value with the second maximum clock deviation accumulated value; and
a first determining submodule, configured to determine the first master clock node as the master clock node for clock synchronization when the first maximum clock deviation accumulated value is less than the second maximum clock deviation accumulated value.

In some embodiments, the apparatus further includes:
a second comparison module, configured to compare the first clock variance value with the second clock variance value when the first maximum clock deviation accumulated value is equal to the second maximum clock deviation accumulated value; and
a first determining module, configured to determine the first master clock node as the master clock node for clock synchronization when the first clock variance value is less than the second clock variance value.

In some embodiments, the plurality of first maximum clock deviations are a plurality of maximum clock deviations corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node; and the plurality of second maximum clock deviations are a plurality of maximum clock deviations corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

In some embodiments, the selection module 703 includes:
a second determining submodule, configured to determine a third maximum clock deviation accumulated value and a fourth maximum clock deviation accumulated value, where the third maximum clock deviation accumulated value is a sum of a maximum clock deviation corresponding to a transmission medium between the first master clock node and the clock synchronization apparatus and the first maximum clock deviation accumulated value; and the fourth maximum clock deviation accumulated value is a sum of a maximum clock deviation corresponding to a transmission medium between the second master clock node and the clock synchronization apparatus and the second maximum clock deviation accumulated value;
a second comparison submodule, configured to compare the third maximum clock deviation accumulated value with the fourth maximum clock deviation accumulated value; and
a third determining submodule, configured to determine the first master clock node as the master clock node for clock synchronization when the third maximum clock deviation accumulated value is less than the fourth maximum clock deviation accumulated value.

In some embodiments, the apparatus further includes:
a second determining module, configured to determine a third clock variance value and a fourth clock variance value when the third maximum clock deviation accumulated value is equal to the fourth maximum clock deviation accumulated value, where the third clock variance value is a square root of a sum of squares of a variance value of a plurality of clock deviations corresponding to a transmission medium between the first master clock node and the clock synchronization apparatus and the first clock variance value, and the fourth clock variance value is a square root of a sum of squares of a variance value of a plurality of clock deviations corresponding to a transmission medium between the second master clock node and the clock synchronization apparatus and the second clock variance value;
a third comparison module, configured to compare the third clock variance value with the fourth clock variance value; and
a third determining module, configured to determine the first master clock node as the master clock node for clock synchronization when the third clock variance value is less than the fourth clock variance value.

In some embodiments, the apparatus further includes:
a fourth comparison module, configured to compare the first priority of the first clock source node with the first priority of the second clock source node when the identifier of the first clock source node is different from the identifier of the second clock source node;
a fifth comparison module, configured to compare the first maximum clock source deviation with the second maximum clock source deviation when the first priority of the first clock source node is equal to the first priority of the second clock source node;
a fourth determining module, configured to determine the first master clock node as a master clock node for clock synchronization when the first maximum clock source deviation is less than the second maximum clock source deviation; and
a second calibration module, configured to calibrate a clock of the clock synchronization apparatus according to time information of the first master clock node.

In some embodiments, the apparatus further includes:
a sixth comparison module, configured to compare the first clock source variance value with the second clock source variance value when the first maximum clock source deviation is equal to the second maximum clock source deviation;
a fifth determining module, configured to determine the first master clock node as a master clock node for clock synchronization when the first clock source variance value is less than the second clock source variance value; and
a third calibration module, configured to calibrate a clock of the clock synchronization apparatus based on the time information of the first master clock node.

In this embodiment of this application, the network device first receives the announce message from the first master clock node and the announce message from the second master clock node, where the announce message from the first master clock node carries the identifier of the first clock source node and the first maximum clock deviation accumulated value, the announce message from the second master clock node carries an identifier of the second clock source node and the second maximum clock deviation accumulated value. Then, the network device compares the identifier of the first clock source node with the identifier of the second clock source node. When the identifier of the first clock source node is the same as the identifier of the second clock source node, it indicates that the first master clock node and the second master clock node correspond to a same clock source node. In this case, the first maximum clock deviation accumulated value and the second maximum clock deviation accumulated value help select, from the first master clock node and the second master clock node, a master clock node with a relatively small clock deviation. Then, the clock of the network device is calibrated based on the time information of the selected master clock node. If clock deviation brought by a path from the clock source node to the master clock node is relatively small, precision of clock synchronization performed by using the master clock node is higher, so that precision of a clock calibrated by the network device is higher.

It should be noted that when the clock synchronization apparatus provided in the foregoing embodiment performs clock synchronization, division into the foregoing functional modules is merely used as an example for description. In an actual application, the foregoing functions may be allocated to different functional modules for implementation according to a requirement, that is, an internal structure of the apparatus is divided into different functional modules, to implement all or some of the functions described above. In addition, the clock synchronization apparatus provided in the foregoing embodiment and the clock synchronization method embodiment belong to a same concept. For a specific implementation process of the clock synchronization apparatus, refer to the method embodiment. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer readable storage medium may be any usable medium accessible by a computer, or a data storage device, such as a server or a data center, which integrates one or more usable media. The usable medium may be a magnetic medium (for example, a floppy disk, a hard disk, or a magnetic tape), an optical medium (for example, a digital versatile disc (DVD)), or a semiconductor medium (for example, a solid state disk (SSD)), or the like.

The foregoing descriptions are merely specific implementations of the present disclosure, but are not intended to limit the protection scope of the present disclosure. Any variation or replacement readily contemplated by a person skilled in the art within the technical scope disclosed in the present disclosure shall fall within the protection scope of the present disclosure. Therefore, the protection scope of the present disclosure shall be subject to the protection scope of the claims.

What is claimed is:

1. A clock synchronization method, comprising:
   receiving, by a network device, a first announce packet from a first master clock node and a second announce packet from a second master clock node, wherein the first announce packet carries a first identifier of a first clock source node and a first maximum clock deviation accumulated value, the second announce packet carries a second identifier of a second clock source node and a second maximum clock deviation accumulated value;
   selecting, by the network device from the first master clock node and the second master clock node based on the first maximum clock deviation accumulated value and the second maximum clock deviation accumulated value, a master clock node for clock synchronization when the first identifier is the same as the second identifier; and
   calibrating, by the network device, a clock of the network device based on time information of the master clock node.

2. The method of claim 1, wherein
   the first maximum clock deviation accumulated value is a sum of a plurality of first maximum clock deviations on a path from the first clock source node to the first master clock node,
   the second maximum clock deviation accumulated value is a sum of a plurality of second maximum clock deviations on a path from the second clock source node to the second master clock node,
   the plurality of first maximum clock deviations are a plurality of maximum clock deviations corresponding to a plurality of clock nodes on the path from the first clock source node to the first master clock node,
   and the plurality of second maximum clock deviations are a plurality of maximum clock deviations corresponding to a plurality of clock nodes on the path from the second clock source node to the second master clock node.

3. The method of claim 2, further comprising:
   determining, by the network device, the first master clock node as the master clock node for clock synchronization when the first maximum clock deviation accumulated value is less than the second maximum clock deviation accumulated value.

4. The method of claim 3, wherein the first announce packet further carries a first clock variance value, the second announce packet further carries a second clock variance value, the first clock variance value is a square root of a sum of squares of a plurality of first clock deviation variance values, the second clock variance value is a square root of a sum of squares of a plurality of second clock deviation variance values, the first clock deviation variance value is a variance value of a plurality of clock deviations corresponding to one clock node on the path from the first clock source node to the first master clock node, and the second clock deviation variance value is a variance value of a plurality of clock deviations corresponding to one clock node on the path from the second clock source node to the second master clock node; and
   the method further comprises:
   determining, by the network device, the first master clock node as the master clock node for clock synchronization when the first clock variance value is less than the second clock variance value and when the first maximum clock deviation accumulated value is equal to the second maximum clock deviation accumulated value.

5. The method of claim 2, wherein the plurality of first maximum clock deviations are a plurality of maximum clock deviations corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node, and the plurality of second maximum clock deviations are a plurality of maximum clock deviations corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

6. The method of claim 5, further comprising:
determining, by the network device, a third maximum clock deviation accumulated value and a fourth maximum clock deviation accumulated value, wherein the third maximum clock deviation accumulated value is a sum of a maximum clock deviation corresponding to a transmission medium between the first master clock node and the network device and the first maximum clock deviation accumulated value, and the fourth maximum clock deviation accumulated value is a sum of a maximum clock deviation corresponding to a transmission medium between the second master clock node and the network device and the second maximum clock deviation accumulated value;
determining, by the network device, the first master clock node as the master clock node for clock synchronization when the third maximum clock deviation accumulated value is less than the fourth maximum clock deviation accumulated value.

7. The method of claim 6, wherein the first announce packet further carries a first clock variance value, the second announce packet further carries a second clock variance value, the first clock variance value is a square root of a sum of squares of a plurality of first clock deviation variance values, the second clock variance value is a square root of a sum of squares of a plurality of second clock deviation variance values, the plurality of first clock deviation variance values comprise a variance value of a plurality of clock deviations corresponding to each clock node on the path from the first clock source node to the first master clock node, and a variance value of a plurality of clock deviations corresponding to a transmission medium between each pair of adjacent clock nodes in at least one pair of adjacent clock nodes in the plurality of clock nodes on the path from the first clock source node to the first master clock node, and the plurality of second clock deviation variance values comprise a variance value of a plurality of clock deviations corresponding to each clock node on the path from the second clock source node to the second master clock node, and a variance value of a plurality of clock deviations corresponding to a transmission medium between each pair of adjacent clock nodes in at least one pair of adjacent clock nodes in the plurality of clock nodes on the path from the second clock source node to the second master clock node; and
the method further comprises:
determining, by the network device, a third clock variance value and a fourth clock variance value when the third maximum clock deviation accumulated value is equal to the fourth maximum clock deviation accumulated value, wherein the third clock variance value is a square root of a sum of squares of a variance value of a plurality of clock deviations corresponding to the transmission medium between the first master clock node and the network device and the first clock variance value, and the fourth clock variance value is a square root of a sum of squares of a variance value of a plurality of clock deviations corresponding to the transmission medium between the second master clock node and the network device and the second clock variance value; and
determining, by the network device, the first master clock node as the master clock node for clock synchronization when the third clock variance value is less than the fourth clock variance value.

8. The method of claim 1, wherein the first announce packet further carries a first priority of the first clock source node and a first maximum clock source deviation, the second announce packet further carries a first priority of the second clock resource-source node and a second maximum clock source deviation, the first maximum clock source deviation is a maximum clock deviation corresponding to the first clock source node, and the second maximum clock source deviation is a maximum clock deviation corresponding to the second clock source node; and
the method further comprises:
determining, by the network device, the first master clock node as the master clock node for clock synchronization when the first maximum clock source deviation is less than the second maximum clock source deviation, when the first identifier is different from the second identifier, and when the first priority of the first clock source node is equal to the first priority of the second clock source node; and
calibrating, by the network device, the clock of the network device based on time information of the first master clock node.

9. The method of claim 8, wherein the first announce packet further carries a first clock source variance value, the second announce packet further carries a second clock source variance value, the first clock source variance value is a variance value of a plurality of clock deviations corresponding to the first clock source node, and the second clock source variance value is a variance value of a plurality of clock deviations corresponding to the second clock source node; and
the method further comprises:
determining, by the network device, that the first master clock node is the master clock node for clock synchronization when the first clock source variance value is less than the second clock source variance value and when the first maximum clock source deviation is equal to the second maximum clock source deviation; and
calibrating, by the network device, the clock of the network device based on the time information of the first master clock node.

10. A clock synchronization apparatus, comprising:
a memory, comprising instructions;
a processor coupled to the memory, when the instructions executed by the processor, cause the apparatus to:
receive a first announce packet from a first master clock node and a second announce packet from a second master clock node, wherein the first announce packet carries a first identifier of a first clock source node and a first maximum clock deviation accumulated value, the second announce packet carries a second identifier of a second clock source node and a second maximum clock deviation accumulated value;

select, from the first master clock node and the second master clock node based on the first maximum clock deviation accumulated value and the second maximum clock deviation accumulated value, a master clock node for clock synchronization when the first identifier is the same as the second identifier; and calibrate a clock of the clock synchronization apparatus based on time information of the master clock node.

11. The apparatus of claim 10, wherein the first maximum clock deviation accumulated value is a sum of a plurality of first maximum clock deviations on a path from the first clock source node to the first master clock node, the second maximum clock deviation accumulated value is a sum of a plurality of second maximum clock deviations on the path from the second clock source node to the second master clock node, the plurality of first maximum clock deviations are a plurality of maximum clock deviations corresponding to a plurality of clock nodes on the path from the first clock source node to the first master clock node, and the plurality of second maximum clock deviations are a plurality of maximum clock deviations corresponding to a plurality of clock nodes on the path from the second clock source node to the second master clock node.

12. The apparatus of claim 11, wherein the instructions further cause the apparatus to:

determine the first master clock node as the master clock node for clock synchronization when the first maximum clock deviation accumulated value is less than the second maximum clock deviation accumulated value.

13. The apparatus of claim 12, wherein the first announce packet further carries a first clock variance value, the second announce packet further carries a second clock variance value, the first clock variance value is a square root of a sum of squares of a plurality of first clock deviation variance values, the second clock variance value is a square root of a sum of squares of a plurality of second clock deviation variance values, the first clock deviation variance value is a variance value of a plurality of clock deviations corresponding to one clock node on the path from the first clock source node to the first master clock node, and the second clock deviation variance value is a variance value of a plurality of clock deviations corresponding to one clock node on the path from the second clock source node to the second master clock node; and the instructions further cause the apparatus to:
a first determining module, configured to determine the first master clock node as the master clock node for clock synchronization when the first clock variance value is less than the second clock variance value and when the first maximum clock deviation accumulated value is equal to the second maximum clock deviation accumulated value.

14. The apparatus of claim 11, wherein the plurality of first maximum clock deviations are a plurality of maximum clock deviations corresponding to a plurality of clock nodes on the path from the first clock source node to the first master clock node, and at least one maximum clock deviation corresponding to a transmission medium between at least one pair of adjacent clock nodes in the plurality of clock nodes on the path from the first clock source node to the first master clock node, and the plurality of second maximum clock deviations are a plurality of maximum clock deviations corresponding to a plurality of clock nodes on the path from the second clock source node to the second master clock node, and at least one maximum clock deviation corresponding to a transmission medium between at least one pair of adjacent clock nodes in the plurality of clock nodes on the path from the second clock source node to the second master clock node.

15. The apparatus of claim 14, wherein the instructions further cause the apparatus to:

determine a third maximum clock deviation accumulated value and a fourth maximum clock deviation accumulated value, wherein the third maximum clock deviation accumulated value is a sum of a maximum clock deviation corresponding to a transmission medium between the first master clock node and the clock synchronization apparatus and the first maximum clock deviation accumulated value, and the fourth maximum clock deviation accumulated value is a sum of a maximum clock deviation corresponding to a transmission medium between the second master clock node and the clock synchronization apparatus and the second maximum clock deviation accumulated value; and determine the first master clock node as the master clock node for clock synchronization when the third maximum clock deviation accumulated value is less than the fourth maximum clock deviation accumulated value.

16. The apparatus of claim 15, wherein the first announce packet further carries a first clock variance value, the second announce packet further carries a second clock variance value, the first clock variance value is a square root of a sum of squares of a plurality of first clock deviation variance values, the second clock variance value is a square root of a sum of squares of a plurality of second clock deviation variance values, the plurality of first clock deviation variance values comprise a variance value of a plurality of clock deviations corresponding to each clock node on the path from the first clock source node to the first master clock node, and a variance value of a plurality of clock deviations corresponding to a transmission medium between each pair of adjacent clock nodes in at least one pair of adjacent clock nodes in the plurality of clock nodes on the path from the first clock source node to the first master clock node, and the plurality of second clock deviation variance values comprise a variance value of a plurality of clock deviations corresponding to each clock node on the path from the second clock source node to the second master clock node, and a variance value of a plurality of clock deviations corresponding to a transmission medium between each pair of adjacent clock nodes in at least one pair of adjacent clock nodes in the plurality of clock nodes on the path from the second clock source node to the second master clock node; and the instructions further cause the apparatus to:
determine a third clock variance value and a fourth clock variance value when the third maximum clock deviation accumulated value is equal to the fourth maximum clock deviation accumulated value, wherein the third clock variance value is a square root of a sum of squares of a variance value of a plurality of clock deviations corresponding to a transmission medium between the first master clock node and the clock synchronization apparatus and the first clock variance value, and the fourth clock variance value is a square root of a sum of squares of a variance value of a plurality of clock deviations corresponding to a transmission medium between the second master clock node and the clock synchronization apparatus and the second clock variance value; and determine the first master clock node as the master clock node for clock synchronization when the third clock variance value is less than the fourth clock variance value.

17. The apparatus of claim 10, wherein the first announce packet further carries a first priority of the first clock source node and a first maximum clock source deviation, the second announce packet further carries a first priority of the second clock source node and a second maximum clock source deviation, the first maximum clock source deviation is a maximum clock deviation corresponding to the first clock source node, and the second maximum clock source deviation is a maximum clock deviation corresponding to the second clock source node; and the instructions further cause the apparatus to:
a fourth determining module, configured to determine the first master clock node as the master clock node for clock synchronization when the first maximum clock source deviation is less than the second maximum clock source deviation, when the first identifier is different from the second identifier, and when the first priority of the first clock source node is equal to the first priority of the second clock source node; and
calibrate a clock of the clock synchronization apparatus based on time information of the first master clock node.

18. The apparatus of claim 17, wherein the first announce packet further carries a first clock source variance value, the second announce packet further carries a second clock source variance value, the first clock source variance value is a variance value of a plurality of clock deviations corresponding to the first clock source node, and the second clock source variance value is a variance value of a plurality of clock deviations corresponding to the second clock source node; and the instructions further cause the apparatus to:
determine the first master clock node as the master clock node for clock synchronization when the first clock source variance value is less than the second clock source variance value and when the first maximum clock source deviation is equal to the second maximum clock source deviation; and
calibrate a clock of the clock synchronization apparatus based on the time information of the first master clock node.

19. A non-transitory computer-readable storage medium having program instructions stored therein, which when executed by a processor, cause the processor to perform operations, the operations comprising:
receiving a first announce packet from a first master clock node and a second announce packet from a second master clock node, wherein the first announce packet carries a first identifier of a first clock source node and a first maximum clock deviation accumulated value, the second announce packet carries a second identifier of a second clock source node and a second maximum clock deviation accumulated value;
selecting, from the first master clock node and the second master clock node based on the first maximum clock deviation accumulated value and the second maximum clock deviation accumulated value, a master clock node for clock synchronization when the first identifier is the same as the second identifier; and
calibrating, by a network device, a clock of the network device based on time information of the selected master clock node.

20. The non-transitory computer-readable storage medium of claim 19, wherein the first maximum clock deviation accumulated value is a sum of a plurality of first maximum clock deviations on a path from the first clock source node to the first master clock node, the second maximum clock deviation accumulated value is a sum of a plurality of second maximum clock deviations on a path from the second clock source node to the second master clock node, the plurality of first maximum clock deviations are a plurality of maximum clock deviations corresponding to a plurality of clock nodes on the path from the first clock source node to the first master clock node, and the plurality of second maximum clock deviations are a plurality of maximum clock deviations corresponding to a plurality of clock nodes on the path from the second clock source node to the second master clock node.

* * * * *

UNITED STATES PATENT AND TRADEMARK OFFICE
CERTIFICATE OF CORRECTION

| | |
|---|---|
| PATENT NO. | : 12,184,405 B2 |
| APPLICATION NO. | : 17/360817 |
| DATED | : December 31, 2024 |
| INVENTOR(S) | : Jingfei Lv, Song Liu and Chuan Xu |

It is certified that error appears in the above-identified patent and that said Letters Patent is hereby corrected as shown below:

In the Claims

In Claim 8, Column 38, Line 19, delete "clock resource-source" and insert --clock source--.

In Claim 19, Column 42, Line 23, delete "information of the selected master" and insert --information of the master--.

Signed and Sealed this
Eleventh Day of March, 2025

Coke Morgan Stewart
*Acting Director of the United States Patent and Trademark Office*